US010511877B2

(12) United States Patent
Maltagliati et al.

(10) Patent No.: US 10,511,877 B2
(45) Date of Patent: Dec. 17, 2019

(54) METHOD AND APPARATUS FOR MODULATING A VIDEO SIGNAL WITH DATA

(75) Inventors: Alan G. Maltagliati, St. Louis, MO (US); James G. Withers, Chesterfield, MO (US)

(73) Assignee: KOPLAR INTERACTIVE SYSTEMS INTERNATIONAL, L.L.C., St. Louis, MO (US)

( * ) Notice: Subject to any disclaimer, the term of this patent is extended or adjusted under 35 U.S.C. 154(b) by 0 days.

(21) Appl. No.: 12/771,571

(22) Filed: Apr. 30, 2010

(65) Prior Publication Data

US 2010/0274643 A1    Oct. 28, 2010

Related U.S. Application Data

(63) Continuation of application No. 12/630,970, filed on Dec. 4, 2009, now Pat. No. 7,900,236, which is a
(Continued)

(51) Int. Cl.
*H04N 7/16* (2011.01)
*H04N 21/414* (2011.01)
*G06Q 30/02* (2012.01)
*H04N 7/025* (2006.01)
*H04N 7/08* (2006.01)
(Continued)

(52) U.S. Cl.
CPC ... *H04N 21/41407* (2013.01); *G06Q 30/0207* (2013.01); *H04N 7/025* (2013.01); *H04N 7/08* (2013.01); *H04N 7/081* (2013.01); *H04N 7/17318* (2013.01); *H04N 21/235* (2013.01); *H04N 21/435* (2013.01);
(Continued)

(58) Field of Classification Search
USPC ....... 455/3.06, 575; 348/513, 516, 547, 553, 348/734; 725/21–23, 60, 113, 133, 141, 725/153; 705/14
See application file for complete search history.

(56) References Cited

U.S. PATENT DOCUMENTS 5,488,423 A * 1/1996 Walkingshaw et al. ........ 725/24
6,411,800 B1 * 6/2002 Emerson, III ............. 455/186.1
(Continued)

*Primary Examiner* — Gigi L Dubasky
(74) *Attorney, Agent, or Firm* — Philip S. Hof; The Small Patent Law Group LLC

(57) ABSTRACT

A system for transmitting auxiliary data within a modulated video signal from a broadcast source to a hand-held device with a slot, the system comprising the broadcast source comprises means for transmitting auxiliary data to the slotted hand-held device via the modulated video signal; an interface device electronically coupled to the hand-held device via the slot and comprises a card microcontroller, a receiver electronically coupled to the card microcontroller for receiving the modulated video signal from the broadcast source, and circuitry electronically coupled to the card microcontroller and the receiver for demodulating the modulated video signal and reproducing the auxiliary data, and transferring the auxiliary data to the hand-held device via an interface protocol, and the hand-held device with the slot comprises a microcontroller for processing the signal auxiliary data received via the interface protocol from the interface device.

23 Claims, 15 Drawing Sheets

Related U.S. Application Data continuation of application No. 10/676,940, filed on Oct. 1, 2003, now Pat. No. 7,650,624.

(60) Provisional application No. 60/415,034, filed on Oct. 1, 2002.

(51) Int. Cl.
| | |
|---|---|
| *H04N 7/081* | (2006.01) |
| *H04N 7/173* | (2011.01) |
| *H04N 21/235* | (2011.01) |
| *H04N 21/435* | (2011.01) |
| *H04N 21/4363* | (2011.01) |
| *H04N 21/4784* | (2011.01) |
| *H04N 21/81* | (2011.01) |
| *H04N 21/478* | (2011.01) |

(52) U.S. Cl.
CPC ... *H04N 21/43637* (2013.01); *H04N 21/4784* (2013.01); *H04N 21/8166* (2013.01); *H04N 21/478* (2013.01)

(56) References Cited

U.S. PATENT DOCUMENTS

| | | | |
|---|---|---|---|
| 2002/0112250 A1* | 8/2002 | Koplar et al. | 725/153 |
| 2002/0183102 A1* | 12/2002 | Withers et al. | 455/575 |
| 2003/0144035 A1* | 7/2003 | Weinblatt et al. | 455/566 |
| 2003/0171096 A1* | 9/2003 | Ilan et al. | 455/3.06 |
| 2004/0198217 A1* | 10/2004 | Lee et al. | 455/3.01 |

* cited by examiner

METHOD AND APPARATUS FOR MODULATING A VIDEO SIGNAL WITH DATA

CROSS-REFERENCE TO RELATED APPLICATIONS

This application is a continuation of U.S. patent application Ser. No. 12/630,970 filed Dec. 4, 2009, which is a continuation of United States Patent Application entitled "Method and Apparatus for Modulating a Video Signal with Data", Ser. No. 10/676,940 (now U.S. Pat. No. 7,650,624 issued Jan. 19, 2010), filed 1 Oct. 2003, which claims the benefit of United States Provisional Patent Application entitled "Method and Apparatus for Modulating a Video Signal With Data", Ser. No. 60/415,034, Filed 1 Oct. 2002 by Yousri H. Barsoum, Alan G. Maltagliati, Daniel A. Ciardullo and Christopher E. Chupp, both of which are herein incorporated by reference and continued preservation of which is requested.

BACKGROUND OF THE INVENTION

The present invention relates to interactive hand-held devices, and more particularly to a method and apparatus for modulating video signals with auxiliary data for reception on and use by receivers such as hand-held devices, and providing promotional opportunities and other benefits to users of these receivers from the reception of the signals.

Users of these hand-held devices and other receivers selectively receive auxiliary data for purposes including enjoyment, promotion, transfer of information, data collection, commercial verification, security, education, and transactions or verifications at points of sale, as well as other commercial, personal, entertainment, or amusement purposes collectively referred to herein as "promotional opportunities".

U.S. Pat. No. 4,807,031 to Broughton et al. ("Broughton") entitled "Interactive Video Method and Apparatus" relates generally to in-band video broadcasting of commands and other encoded information to interactive devices. The invention described therein relates generally to interactive educational and entertainment systems, and is described in one embodiment in the context of television program control of toys located where there is a television receiver, as within a residence.

To encode control data capable of providing a benefit to a user, Broughton discloses a novel method of luminance or chrominance modulation of a video signal that creates a composite video signal (i.e., a modulated video signal), wherein the video signal is modulated with control data. The novel modulation method alternately raises and lowers the luminance/chrominance of adjacent horizontal scan lines to create a video subcarrier that contains the control data.

In Broughton, the video signal is not being replaced with other data, nor is the data being added as a separate signal along with the video signal. Rather, the video signal itself is modulated to carry the control data. Therefore, the control data is a part of, or contained within, the video signal and yet is imperceptible to the human eye. The encoding method also includes preview and remove circuitry to ensure suitability or the presence of data encoding and removal of data encoding, respectively.

The control data is transmitted either by television broadcast means, or by pre-recorded video players that are connected to a video display. The control data is then received by the video display where at least one video field of the video display is modulated by control data. The control data is then detected with either opto-electronic or radio frequency (RF) detection means that discriminate between the program material and the control data to detect the control data. The detected control data is further reproduced so that the control data can be used with an interactive device.

The encoding method of Broughton may be used to record a "1" or a "0" on every field of a television video signal. Since under NTSC standard the video signal is broadcast at 30 frames a second, there are 60 fields per second resulting in a data rate of 60 bits per second. However, it is often difficult to achieve 60 bits per second of reliable continuous data using this method as will be explained in greater detail below.

In addition to Broughton's data transmission rate being relatively slow, it may not be reliably used for transmitting long data strings to portable devices and other receivers for processing and reproduction. Accordingly, Broughton in one application is typically used by interactive devices to capture auxiliary data that triggers action on the device (i.e., the device acts in a triggered mode). Furthermore, the auxiliary data signals of Broughton are detected asynchronously, as the decoding process on the interactive devices and other receivers (e.g., decoder boxes) are not synchronized to the video signal received from the display device. Moreover, the beginning of a video field was undeterminable by the interactive device of Broughton.

Broughton preferably operates by superimposing a 7875 Hz subcarrier on the video signal, which is at a rate of half the 15750 Hz horizontal retrace frequency. To modulate the video signal with a subcarrier signal, the intensity of one horizontal line is raised and the intensity of the next line in a field is lowered thereby resulting in the 7875 Hz subcarrier signal.

An example of an implementation of Broughton is as follows: an encoder splits each field of a video signal into 8 equal slices, with each slice occupying approximately 2 milliseconds and encoded with the same data bit. The interactive device records and tracks every eighth bit, and thereafter compares the most recent 8 bits (i.e., 1 byte) it receives to the desired combination of 8 bits stored in a table on the interactive device. If there is a match between the two different sets of 8 bits, the interactive device then proceeds to match a second byte and then a third byte. Once all three bytes are matched, action is triggered on the interactive device, which may include a visual or audio notification of a promotional opportunity. Despite the success of Broughton, there is a need in the art for a new apparatus and method for modulating a video signal with data that is faster and more reliable.

Improvements on the method of modulation described in Broughton are described in U.S. Pat. No. 6,094,228 to Ciardullo et al. and U.S. Pat. No. 6,229,572 to Ciardullo et al. (referred to collectively herein as "Ciardullo"). Both Ciardullo patents describe improved methods of modulation wherein the carrier signals relating to control data (i.e., auxiliary data) are inserted on the visual portion of a video signal by changing the luminance of paired lines in opposite directions. Instead of raising and lowering the intensity on an entire scan line of a video signal as in Broughton, Ciardullo uses pseudo noise sequences to raise and lower the intensity on portions on a series of first lines on every other video scan line in a field of a video signal, where the lines paired to the first lines are modulated with the inverse pseudo noise sequences. Ciardullo thereby allows larger amounts of auxiliary data to be modulated in video signals by use of the pseudo noise sequences. Broughton and Ciardullo, which are owned by the assignee of the present invention, are incorporated by reference herein.

Prior efforts by the assignees of the present patent application include United States Utility patent application entitled "Interactive Optical Cards and Other Hand-Held Devices with Increased Connectivity", Serial No.: U.S. Ser. No. 09/489,373, filed Jan. 21, 2000 of Edward J. Koplar and Daniel A. Ciardullo ("Koplar I"), which is incorporated by reference herein. Koplar I relates to various methods and apparatuses for use with promotion opportunities, such as interactive advertising and gaming. Koplar I describes various methods for receiving and providing data and signals to hand-held devices, as well as apparatuses for use with promotional opportunities and methods of using the same.

Another patent application by the assignees of the present invention is United States Utility Patent Application entitled "Universal Methods and Device for Hand-Held Promotional Opportunities", Ser. No. 09/829,223, filed 9 Apr. 2001 of Edward J. Koplar, Daniel A. Ciardullo, James G. Withers and Christopher E. Chupp ("Koplar II"), which is incorporated by reference herein. Koplar II describes additional methods for receiving and providing data and signals to hand-held devices, as well as apparatuses for receiving promotional opportunities and methods of using the same.

Yet another patent application by the assignees of the present invention is U.S. Patent Application entitled "RBDS Method and Device for Processing Promotional Opportunities", Ser. No. 10/126,770, filed on Apr. 19, 2002, of James G. Withers and Alan G. Maltagliati (referred to hereinafter as "Withers"), which is incorporated by reference herein. Withers I describes further improvements to Koplar I and Koplar II including the transmission of auxiliary data to a hand-held device by use of the RBDS system.

For purposes of the present invention, the term "hand-held device" means an interactive device of portable character, preferably of hand-held type that may be carried in the palm by a user, between fingers of the user, or is otherwise intended to be easily grasped and handled manually by the user. By way of example, hand-held devices includes smart cards, mobile phones, personal digital assistants (PDAs), gaming devices and other hand-held devices capable of receiving and processing auxiliary data.

The present invention need not be implemented by manufacturing a customized hand-held device to incorporate functionality of the present invention. Hand-held devices may have a slot that typically allows the device to receive memory cards and sometimes may allow it to use specially designed interface cards to receive other types of information.

A memory card, which may also be referred to as a flash memory card or a storage card, is a small storage medium that typically uses flash memory to store data such as text, pictures, audio, and video for use by small, portable electronic and computing devices. Memory cards on the market as of the date of the present invention include the SD™ (secure digital) card, the CompactFlash® card, the Memory Stick® card, the MultiMediaCard™ (MMC) and the SmartMedia® card. Memory cards are non-volatile solid-state devices that offer a combination of high storage capacity, fast data transfer, increased flexibility, excellent security and small size. Memory cards are typically accepted via a slot on portable devices.

Although slots are primarily used to receive memory cards that only provide data storage, some of the slots' functionality are not so limited and are capable of interfacing with peripheral devices. An example of the foregoing is the SD slot, which was originally intended to provide portable devices with flash memory. However, the slot was written with an open standard so that computer software operating on a portable device may be written to control peripheral devices connected through use of the SD slot, and such hand-held devices with a slot and open protocol are referred to herein as "slotted hand-held devices". At the time of this invention, SD slots are available in cameras, cell phones, MP3 players and other portable devices.

An interface device is a card capable of insertion into a card slot with a primary purpose of obtaining data or other input from sources not traditionally available to a slotted hand-held device and is referred to hereinafter as an "interface card". The biggest advantage of manufacturing and using an interface card (i.e., with a slotted hand-held device as opposed to a customized hand-held device) is that the interface card takes advantage of the resources (e.g., an LCD, Internet access, a keypad, etc.) on existing slotted hand-held devices, thereby reducing the manufacturing cost and increasing the functionality of existing such devices.

An interface protocol such as SDIO (the SD input and output) protocol is a standard implemented on various slotted hand-held devices that allows storage media and peripheral devices to be operated through use of an appropriate slot (e.g., the SD slot). For example, a PDA with a SD slot and enabled with the SDIO protocol and related software that has a SD card outfitted with a camera-like device inserted into its SD slot may use a camera-like device to take photographs that are stored on the PDA or are automatically uploaded to a predetermined Internet location.

Another device that may be configured to be a slotted hand-held device is the Nintendo® Gameboy® game unit. As of late 2002, there are approximately 25,000 Nintendo® Game Boy Advance® game units sold every day, and over 100,000,000 Gameboy game units currently in use worldwide. While Gameboy game units are not equipped with a slot such as a SD memory slot, a company operating under the name X-traFun has developed a Bluetooth™-ready Gameboy cartridge outfitted with a SD slot. The cartridge provides a network mechanism to communicate, and the slot enables the reception of storage and interface cards to provide functionality of the present invention.

Radio Broadcast Data Service (RBDS; known as RDS outside of the United States) was recently authorized by the FCC as a method for sending text to FM radio receivers. Envisioned uses of RBDS include call letter/slogan display info, song titles/lyrics, and traffic and weather info. Car radios, in particular, were designed so that text received using RBDS could be displayed on the LCD tuning window of a car radio, alternating with, or taking the place of, the normal frequency readout. The speed of the system (throughput) is fairly slow at between 1200 to 2400 bps. To date, the system is underutilized, with no practical uses having been identified.

Radio salespeople have long struggled to answer a basic objection from advertisers when comparing radio advertising to print; namely, the inability of radio to offer "hard copy" coupons. Advertisers have always viewed couponing as a surefire way to gauge the effectiveness of advertising, since there is a paper trail (the redeemed coupons) from a print advertisement that does not exist with a radio advertisement. Thus, it is desirable to provide a practical means of radio couponing by which "off of the air" promotional opportunities are received directly on a hand-held device.

The term "computer" is also used herein in its broadest possible sense, and may include without limitation a laptop, compact or personal computer, mobile phone, gaming device, personal digital assistant (PDA), or other computer-like device, or other devices using one or more microprocessors or digital processors to achieve a computing or data processing or data manipulative process or comparable or similar functions.

SUMMARY OF THE INVENTION

The present invention comprises a method and device for modulating a video signal with data. More specifically, the method involves a user directing a slotted hand-held device with an interface card at a display device that is presenting video signals modulated with auxiliary data from a broadcast source.

The hand-held device has a microcontroller and associated circuitry that determines the timing of the video signals by use of a vertical retrace signal of the display device. The video signals are received on the interface card by use of an optical detector. The microcontroller of the interface card then determines whether auxiliary data is present in the video signals. The microcontroller next evaluates whether the received auxiliary data relates to data packets. If so, then the microcontroller assembles the data packets to provide the user with useful data and providing the user of the slotted hand-held device with promotional opportunities or other benefits from the reception of useful data.

In the preferred embodiment of the present invention, various suitable hand-held devices may be used to provide the functionality of the present invention by use of an interface card attached to a slotted hand-held device and appropriate software running on the slotted hand-held device to interpret the received data. Preferably, the present invention uses a SD card and the SDIO protocol to interface with Nintendo's Gameboy, Compaq's iPAQ, and other slotted hand-held devices that include a SD slot.

When auxiliary data is reproduced by use by the interface card or hand-held device, various signals, indications, display readouts, or other interactive events provide the user with promotional opportunities and other benefits according to content of the auxiliary data. The various interactive events described in Koplar I, Koplar II and Withers, incorporated by reference herein, are usable interchangeably by and in conjunction with the hand-held device and methods of use with the present invention. The interchangeability includes selective use of the features of the present invention, along with selective use of any of the various apparatuses and methods of Koplar I, Koplar II and Withers.

BRIEF DESCRIPTION OF THE DRAWINGS

Corresponding characters indicate corresponding elements in the views of the drawings.

DETAILED DESCRIPTION OF THE INVENTION

The following method and apparatus for a modulating a video signal with data is an improvement upon the method and apparatus previously disclosed in Broughton. Broughton discloses a communication system that allows auxiliary data to be received from a display device, wherein the data is preferably read optically by a hand-held device through use of a photodetector.

Figure 1:
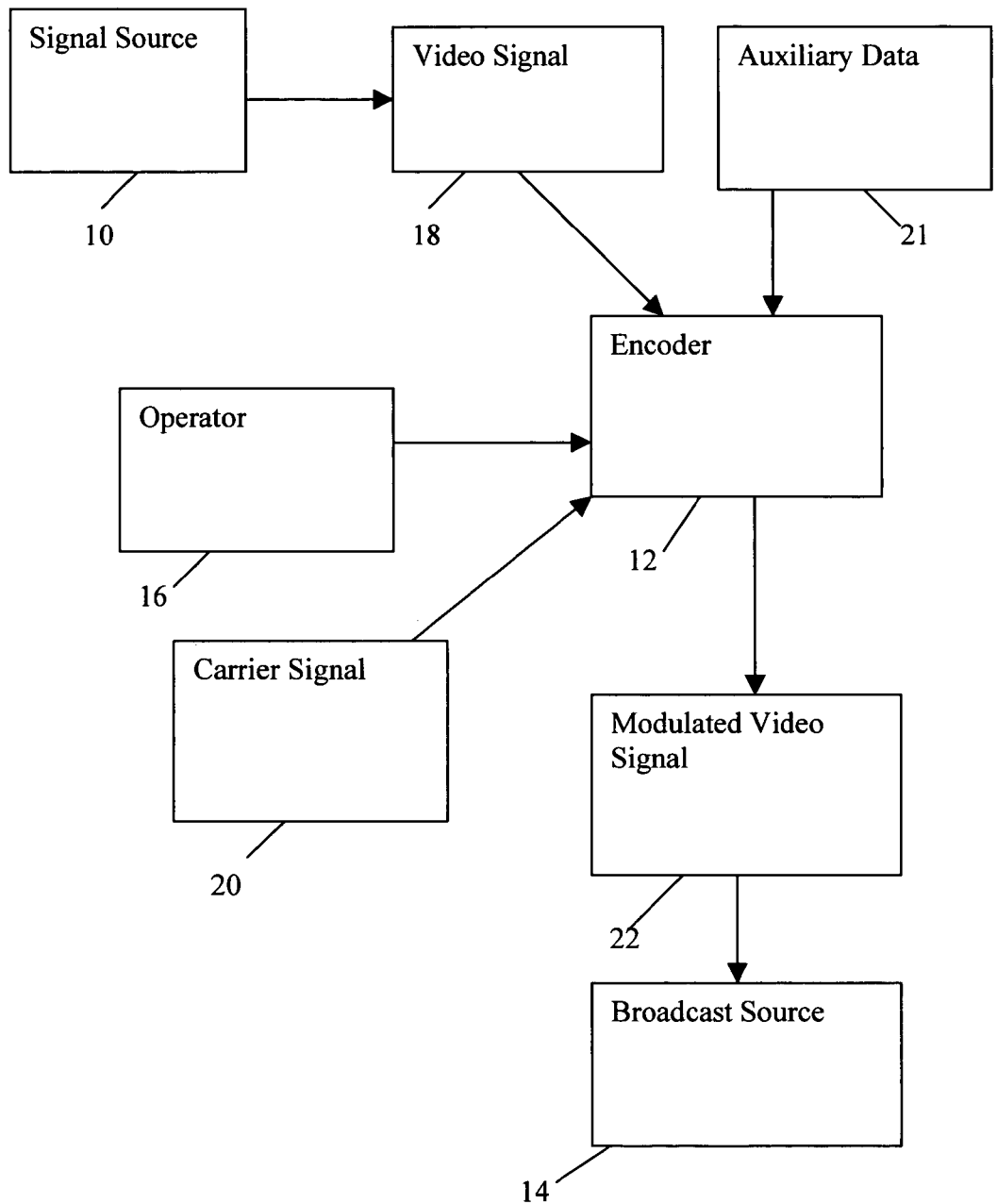
FIG. 1 is a flow chart of the method of encoding of the present invention.

Referring to FIG. 1, a video signal 18 is transmitted from a signal source 10 to an encoder 12. Video signal 18 is preferably an analog NTSC video signal, but may be other video signals or video signal formats compatible with the present invention. Signal source 10 is typically a professional grade video tape player with a video tape containing a video program, but may also be other sources of video signals including a camcorder or a digital versatile disc (DVD) player with a DVD video containing a program. Encoder 12 is described in further detail in the description of FIG. 5 below.

Operator 16 interacts with encoder 12 to control its operation. Preferably, operator 16 is a person that interacts with encoder 12 through the use of a computer or other electronic control device. However, operator 16 may consist entirely of a computer or other electronic control device that directs operation of encoder 12 in an automated manner.

A carrier signal 20 is selectively added to video signal 18 by operator 16 at encoder 12 to modulate auxiliary data 21 within video signal 18. The method of adding carrier signal 20 is by selectively increasing and decreasing pixel intensity of paired scan lines as disclosed in Broughton. However, the present encoding method differs from Broughton in that encoder 12 splits each field of video signal 18 into multiple segments, such that each segment may be individually modulated with carrier signal 20 and the complement of the data bit broadcast on the first field is modulated on the second field, as will be described in further detail below. It should be appreciated that the present method of selectively modulating can reverse the order of the fields (i.e., the first field and second field) as needed or desired in a particular embodiment. In the preferred embodiment, the present invention utilizes four equal segments per field.

Upon modulating video signal 18, encoder 12 outputs a modulated video signal 22 comprised of video signal 18 and auxiliary data 21 (i.e., a composite video signal). Modulated video signal 22 is then provided to a broadcast source 14 for distribution to end-users who will view the program. Broadcast source 14 is preferably a television broadcast station that broadcasts programs, but also may be other broadcast video sources and DVD media and other media sources including video tapes that will be provided to one or more end users.

Figure 2:
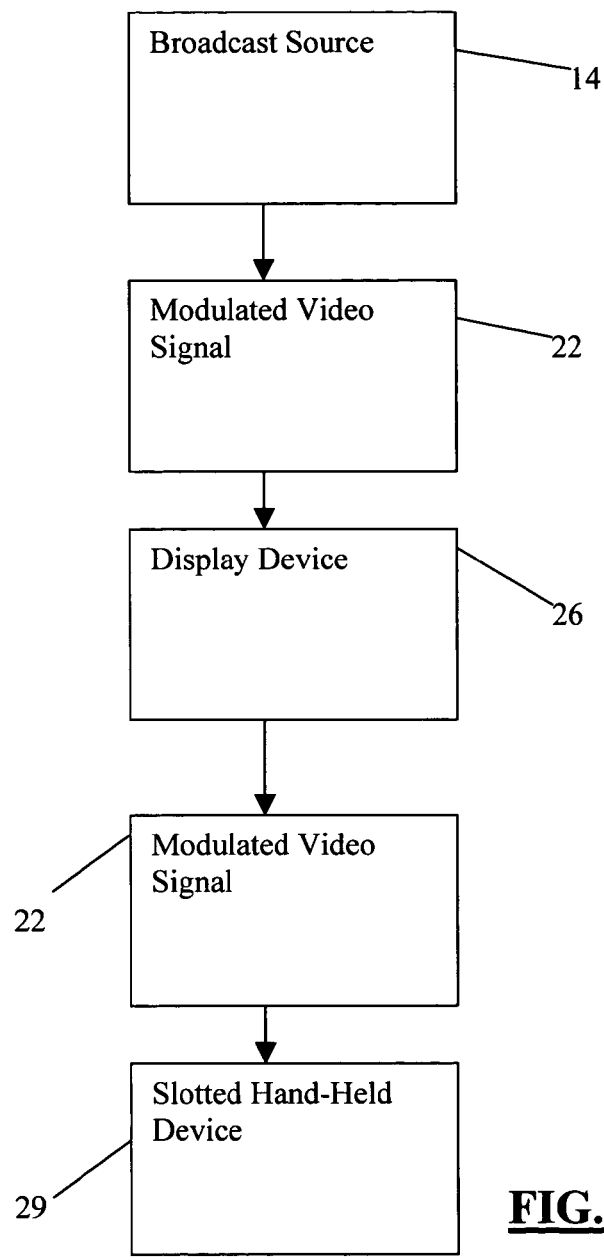
FIG. 2 is a flow chart of the method of decoding of the present invention.
Figure 3:
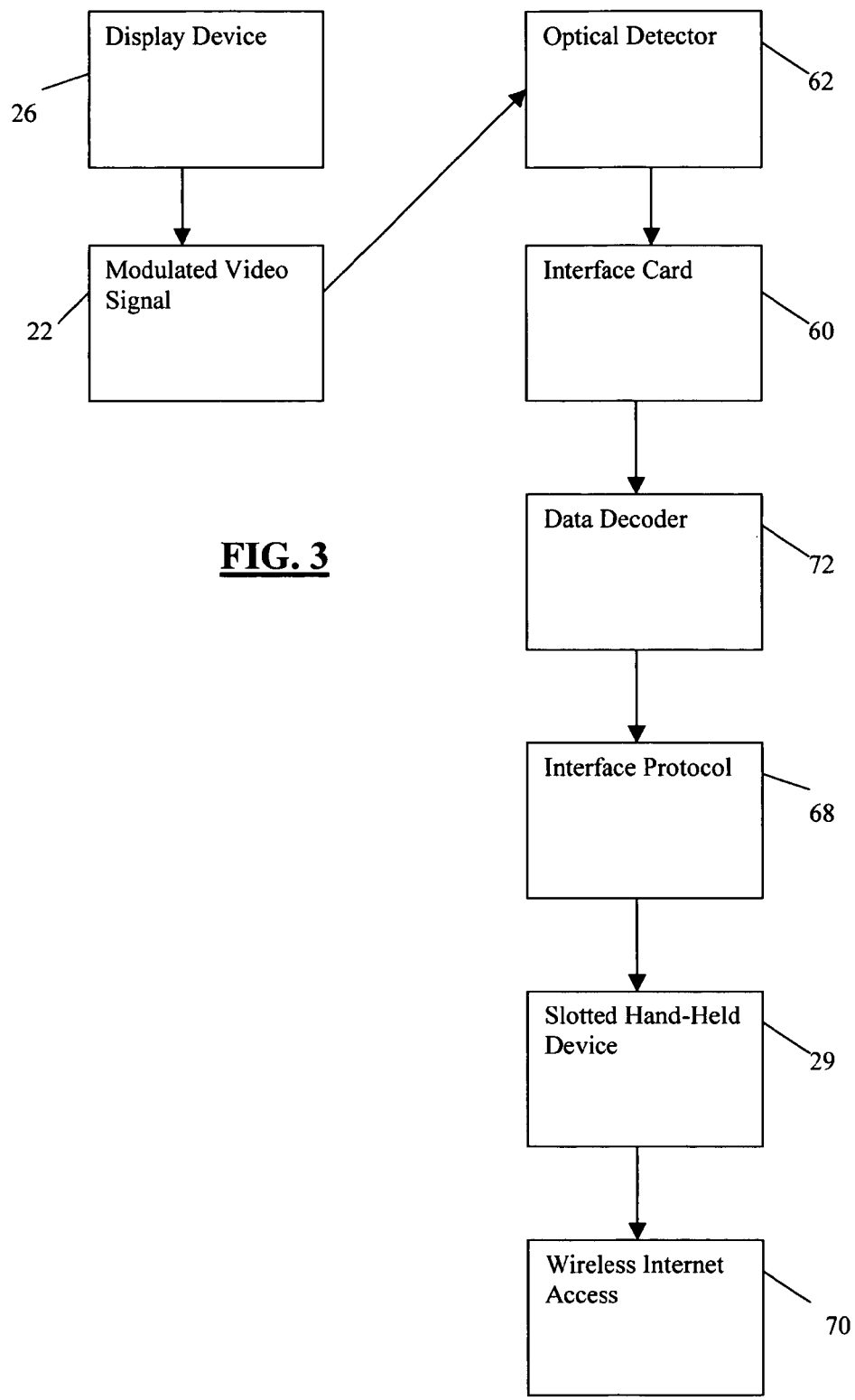
FIG. 3 is a block diagram of the decoder of the present invention.

Referring to FIGS. 2 and 3, broadcast source 14 provides modulated video signal 22 to display device 26. Display device 26 is representative of a television screen, video monitor or other video display, movie screen, computer monitor, video-converted display or video-like display, capable of receiving analog or digital video or video-representative signals from a suitable signal source, such as a television transmitter, a videotape, a streaming video server, a DVD, or the computerized display representation of such a source of image content. For present purposes, it will be assumed that display device 26 is a kinescope or other conventional type of television display or monitor (which may include multiple or single-beam types of projector displays).

Display device 26 may schematically represent a video display for displaying video signals 18 but may also be any sort of electron gun, active, array or passive array display device capable of providing not only imaged information in a visible mode but also auxiliary information (e.g., data) in a substantially transparent mode. Display device 26 may be further characterized as a computer monitor or display, as well as a portion or computer window of display device 26. Display device 26 may also be a high definition or digital television, or other digital video presentation device. Display device 26 may vary in size, and may be small like a Sony® Watchman®, or large like a movie screen or a Sony Jumbotron®. Video signals 18 receivable from broadcast source 14 by display device 26 include those delivered by microwave relay, satellite retransmission or cable, streaming and other types of downloadable or viewable computer video presentations, and those generally made available by wired or wireless methods.

Modulated video signal 22 is presented on display device 26. Slotted hand-held device 29 optically receives modulated video signal 22 by use of a photodetector 62 on an interface card 60. Slotted hand-held device 29 may be in the form of any type of hand manipulable device such as a smart card, cell phone, PDA, game unit or other palm like device that has a slot 66. Slotted hand-held device 29 may be held in the palm or between the fingers of a user in the general vicinity of display device 26, typically within the same room and, when necessary, oriented so that photodetector 62 may optically receive light from a visual representation of modulated video signal 22 from display device 26. It should be appreciated that photodetector 62, interface card 60, data decoder 72 and slotted hand-held device 29 may alternatively be combined in a non-slotted hand-held device 28 such as used in Koplar I.

In the preferred embodiment of the present invention, a slotted hand-held device 29 such as a PDA, game unit, or cellular telephone is outfitted with a slot 66 and contains software and/or other electronics to run an interface protocol 68. The present invention may be used with various interface cards 60 and slots 66 provided that device 29 uses an interface protocol 68 that allows for expansive use of its protocol (i.e., an "open protocol") with card 60 and slot 66. Preferably, slot 66 is a SD slot and interface protocol 68 is the SDIO protocol. An interface card 60 also operating interface protocol 68 is inserted into slotted hand-held device 29, and device 29 runs software to interpret data received by card 60 and passes it to device 29 by use of interface protocol 68.

The non-optical receiver 64 may receive data such that sports fans (also users) may get live statistics and trivia through use of their hand-held device 29 while they watch the game live and at home. The data at the receiver 64 (of a hand-held device) may also download or receive a question, either during the broadcast or prior to the broadcast, by use of auxiliary data and the methods described herein. The questions are synched to a broadcast, such that when hand-held device 29 first presents the questions, the auxiliary data triggers hand-held device 29 to display the question and possible answers. The user chooses the correct answer, or places the answer in order in a timely manner, or must otherwise comply with the rules of trivia game request in a similar manner to that of the contestants. Hand-held device 29 may also be used with other trivia applications as follows: User takes hand-held device 29 and appropriately configures it to receive modulated video or signals from broadcast device. In an example, any participatory game shows produced for television distribution, whether produced and distributed for broadcast, cable, direct satellite, or close circuit transmission; whether distributed by means of home video or DVD may be encoded with auxiliary data enabling viewers of programming material to decode either optically or electronically; process, store and display the data on hand-held device 12 for the purpose of winning prizes or accumulating points. Participatory type games (for use by gaming participants) include: (1) Games revolving around trivia questions dealing with subjects such as sports, music, news, movies; (2) Games revolving around Multiple choice questions; (3) Games dealing with true or false/yes or no type questions; (4) Games dealing with guessing letters; and (5) Games dealing with question revolving around Who? What? Where? When? How? or Why? Signals are received, detected, and reproduced by the new hand-held devices for various promotional opportunities including: enjoyment; promotion; coupon or prize validation; advertising by sponsors; advertising verification and polling; transfer of information; data collection; commercial verification; security and access; education; game playing; transactions, verifications, or redemption by sponsoring entities or related commercial locations at points of sale including the Internet; other commercial and non-commercial purposes.

As further shown in FIG. 3, modulated video signal 22, comprised of video signal 20 and auxiliary data 21, is transmitted from display device 26 and detected by photodetector 62 on interface card 60. Thereafter, the received modulated video signal 22 is decoded by a data decoder 72 located on interface card 60. The decoded auxiliary data 21 is passed to slotted hand-held device 29 through use of an interface protocol 68. Slotted hand-held device 29 utilizes auxiliary data 21 to provide the user with a benefit or promotional opportunities based on the receipt of auxiliary data 21. The promotional opportunities may be redeemed or obtained using the optional wireless Internet access 70, as described in Koplar I.

The slotted hand-held device 29 preferably uses wireless Internet access 70 to provide and/or redeem promotional opportunities over the Internet. The preferred protocol for wireless Internet access is the use of Bluetooth. Bluetooth provides a means for RF data to be passed in a specified form at a 2.4 GHz frequency between slotted hand-held device 29 and a transceiver that is connected to the Internet. It will be appreciated in the art of Internet networking that other means of providing wired and wireless Internet may be used with the present invention including Wifi 802.11.

As a further embodiment of the present invention, interface card 60 may, in addition to or an alternative of photodetector 62, receive modulated video signal 22 or auxiliary data 21 by other means including by use of a RF receiver such as when broadcast source 14 is a decoder box that demodulates the modulated video signals and transmits auxiliary data 21 by various methods known in the art of signal transmission including RF.

Also, when desirable, data storage (not shown) may be added to interface card 60 to store auxiliary data 21 or promotional opportunities for later recall. It should be appreciated that, depending on the application, it may be desirable to provide a large amount of space on interface card 60 thereby allowing a significant amount of data to be stored and later retrieved.

Figure 4:
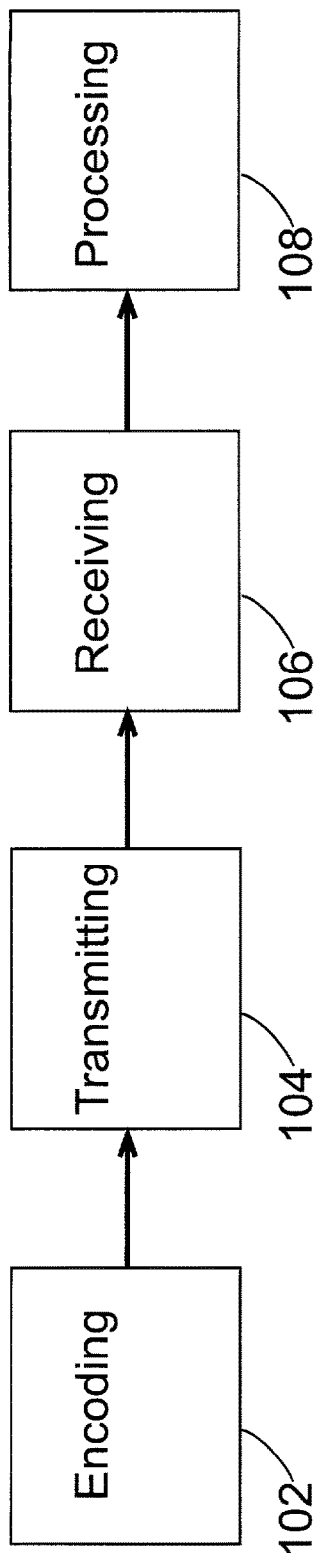
FIG. 4 is an alternate embodiment of the method of decoding of the present invention.

In an alternate version of the optical detection of FIG. 2, FIG. 4 shows electrical detection of auxiliary data 21. Broadcast source 14 provides modulated video signal 22 to a decoder 13. As discussed in greater detail below, decoder 13 acts in a similar manner to data decoder 72 by determining whether auxiliary data 21 is present in modulated video signal 22 but also contains transmission device 24 and a video output to provide the modulated video signal 22 to a display device 26. Auxiliary data 21 is provided to a transmission device 24, which transfers the information to a non-slotted hand-held device 28 without a photodetector 62 but with a non-optical receiver 64 such as RF receivers, infrared and computer-like interconnections. Modulated video signal 22 is passed unaltered through decoder 13 and out the video output and presented on display device 26 so that a user may watch the video program. Upon receipt of auxiliary data 21, non-slotted hand-held device 28 provides the user with a benefit or promotional opportunity.

In an alternate version of the foregoing, non-optical receiver 64 may be implemented on interface card 60 such that slotted hand-held device 29 replaces non-slotted hand-held device 28 and acts in a manner consistent with the foregoing description.

Figure 5:
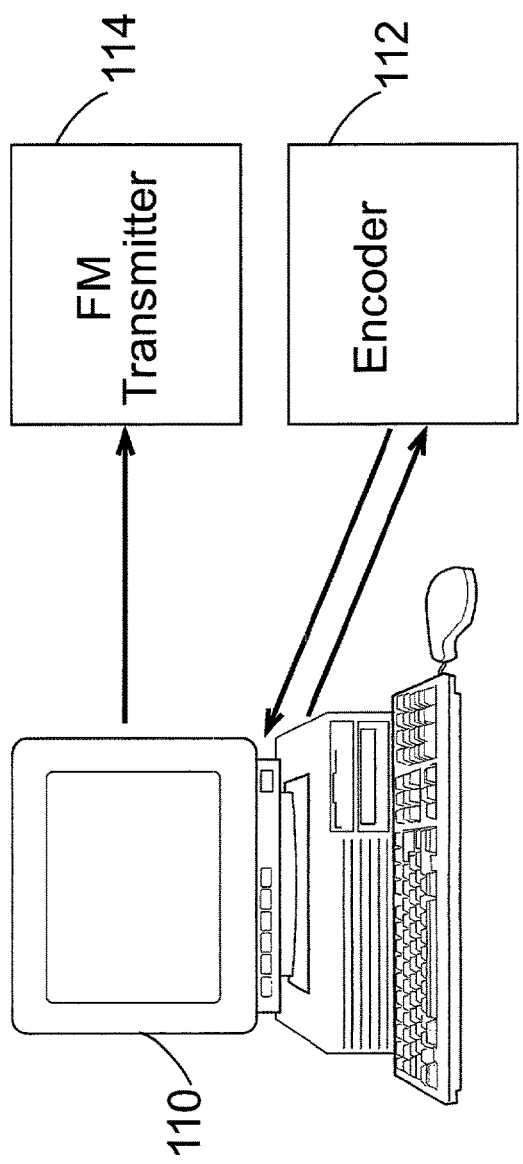
FIG. 5 is a block diagram of the encoder of the present invention.

Encoder 12 in FIG. 5 includes a digital video input 30 to receive a video signal 18 from signal source 10 and to pass it to micro-controller 36. However, encoder 12 may receive an analog video signal 18 via analog video input 32 and analog to digital converter 34. Analog to digital converter 34 digitizes the analog video signal 18 according to known techniques such that it may be sent to micro-controller 36.

Micro-controller 36 is electronically connected to a carrier presence 38, which provides micro-controller 36 with the timing of where, when and at what intensity encoder 12 should insert carrier signal 20 into video signal 18 at the direction of operator 16. Preferably, such instructions are received from operator 16 by carrier presence 38 via a serial port. However it should appreciated in the art of electronics that other device interconnects of encoder 12 are contemplated, including via universal serial bus (USB), "Firewire" protocol (IEEE 1394), and various wireless protocols. In an alternate embodiment, carrier presence 38 may be an operator interface so that operator 16 can directly interface with encoder 12.

Once micro-controller 36 receives video signal 18 and information from carrier presence 38, software 50 manages further operation of encoder 12 and directs micro-controller 36 to store the chrominance information of video signal 18 in storage 40. Encoder electronics 42 at the direction of software 50 preferably uses the methods of Broughton and the present invention as will be described in further detail below to modulate carrier signal 20 into the luminance of video signal 18 thereby creating modulated video signal 22. The resulting modulated video signal 22 is then sent digitally from encoder 12 by digital video output 44, or in analog form by converting the resulting digital signal with digital to analog converter 46 and outputting modulated video signal 22 by analog video output 48.

Micro-controller 36 may consist of more than one processor to manage the various processing and input/output of the present invention, but preferably consists of a single processor. Moreover, the specific electronics and software used by encoder 12 may differ when its technology is included in a pre-existing device as opposed to a stand alone device. Encoder 12 may comprise varying degrees of hardware and software, as various components may interchangeably be used as either.

Figure 6:
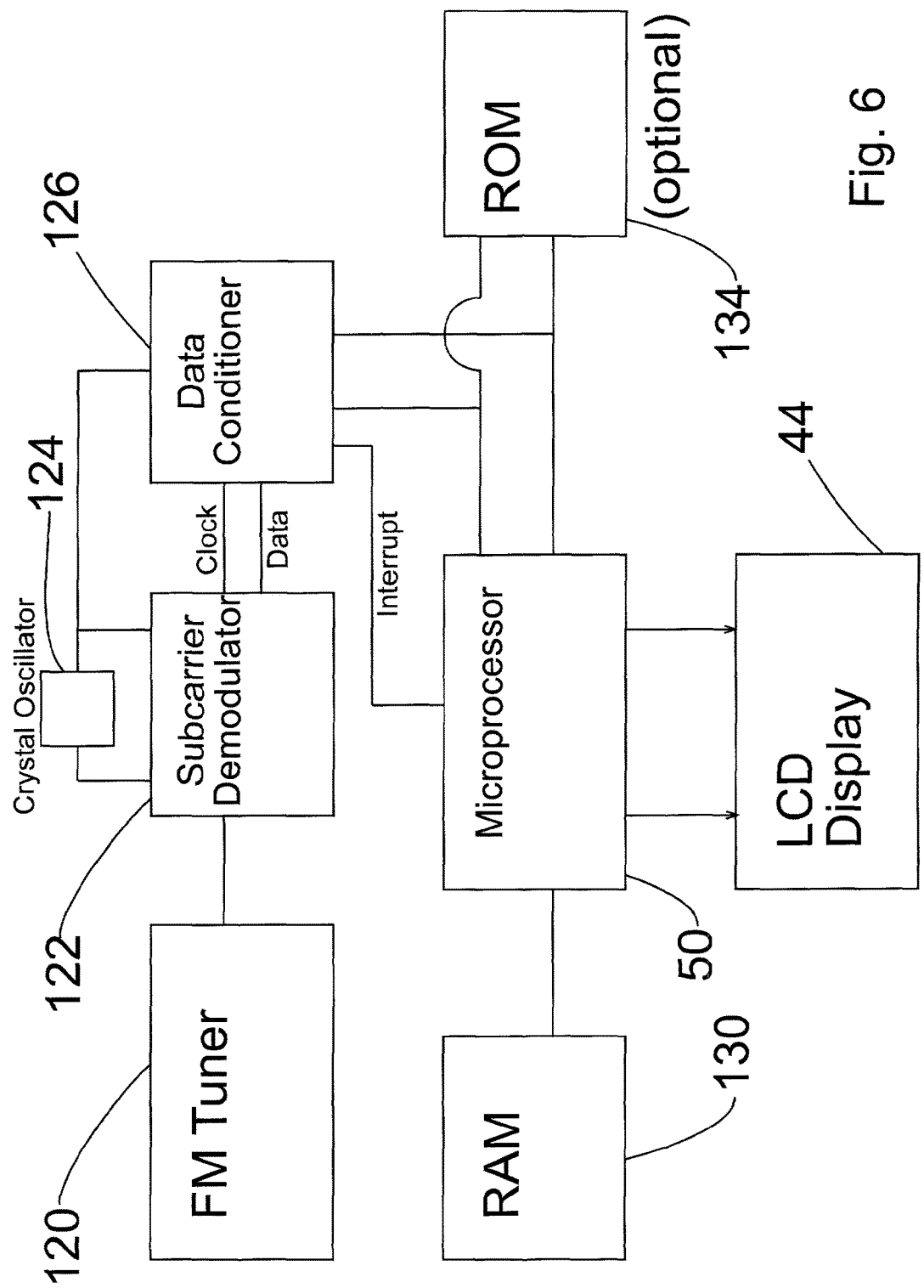
FIG. 6 is a schematic circuit arrangement of one embodiment of the hand-held device of the present invention.

FIG. 6 shows an overview of the preferred embodiment of a microcontroller 100 and device circuitry 102 of data decoder 32. Device circuitry 102 is comprised of an analog pre-filter 104, a vertical detect/signal strength circuitry 106 and an auxiliary data detector 108, all of which are operatively associated with each other and microcontroller 100 as shown.

Figure 7:
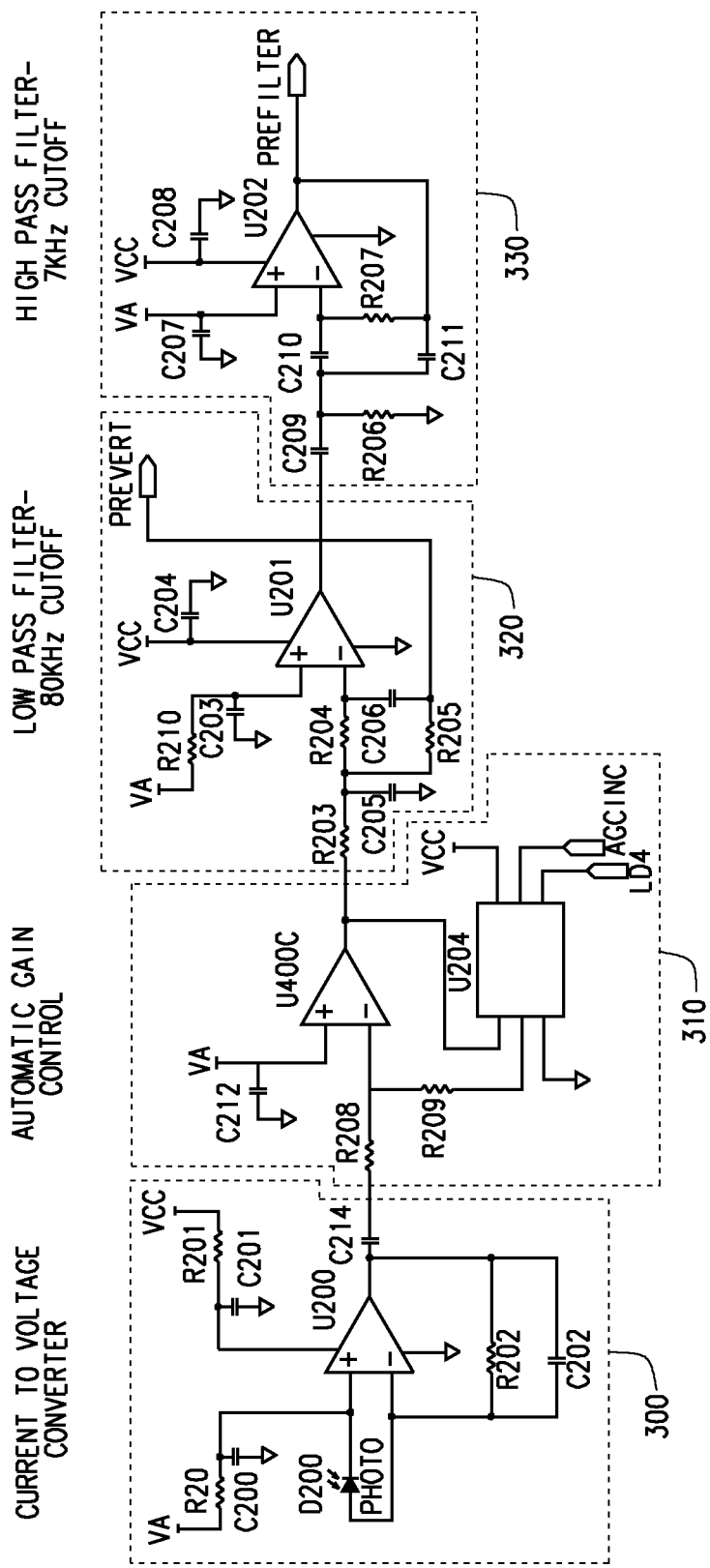
FIG. 7 is a schematic circuit diagram of an analog pre-filter of the data decoder of the invention.

Referring to FIG. 7, the preferred embodiment of analog pre-filter 104 that prepares the circuit for accurate digitization first comprises a current voltage converter 300. Current voltage converter 300 first comprises a photodetector D200, which optically reads a video signal 18 from display device 26 and outputs a current to voltage converter 300. Thereafter, current voltage converter 300 transforms the current detected by photodetector D200 into voltage. The circuitry of voltage converter 300 further comprises three resistors, R200, R201 and R202, three capacitors C200, C201 and C202, an operational amplifier U200 and voltages VA and VCC, all of which are operatively associated as shown.

An automatic gain control 310 portion of analog prefilter 104 amplifies video signal 18 by changing the resistance on the feedback circuit. The amount of gain provided to the circuit is controlled by microcontroller 100. Automatic gain control 310 is used with interface card 60 as the distance and intensities received from display device 26 will vary. Accordingly, when the strength of video signal 18 is low, it is desirable to add gain so that a better reading of video signal 18 is possible. Therefore, the present invention measures the signal strength and decides whether to lower or increase the gain. The components of automatic gain control 310 include resistors R203, R208 and R209, capacitor C212, voltages VA and VCC an operational amplifier U400C and a digital potentiometer U204, all of which are operatively associated as shown.

Video signal 18 passes from automatic gain control 310 to low pass filter—80 KHz cutoff 320. This circuit provides a low pass filter that removes the high frequency noise from the signal by eliminating all frequencies above a preset level (i.e., 80 kilohertz). The components of the low pass filter—80 KHz cutoff 320 include resistors R210, R204 and R205, capacitors C203, C204, and C206, voltages VA and VCC and operational amplifier U201, all of which are operatively associated as shown.

Video signal 18 then passes from the low pass filter—80 KHz cutoff 320 to the high pass filter 7 KHz cutoff 330. High pass filter 7 KHz cutoff 330 cleans the signal below 7 KHZ by discarding the undesired signal. The components of the high pass filter—7 KHz cutoff 330 include resistors R206 and R207, capacitors C207, C208, C209, C210 and C211, voltages VA and VCC and operational amplifier U201, all of which are operatively associated as shown. Once the signal passes through high pass filter 7 KHz cutoff 330, the pre-filtering of video signal 18 is complete.

Figure 8:
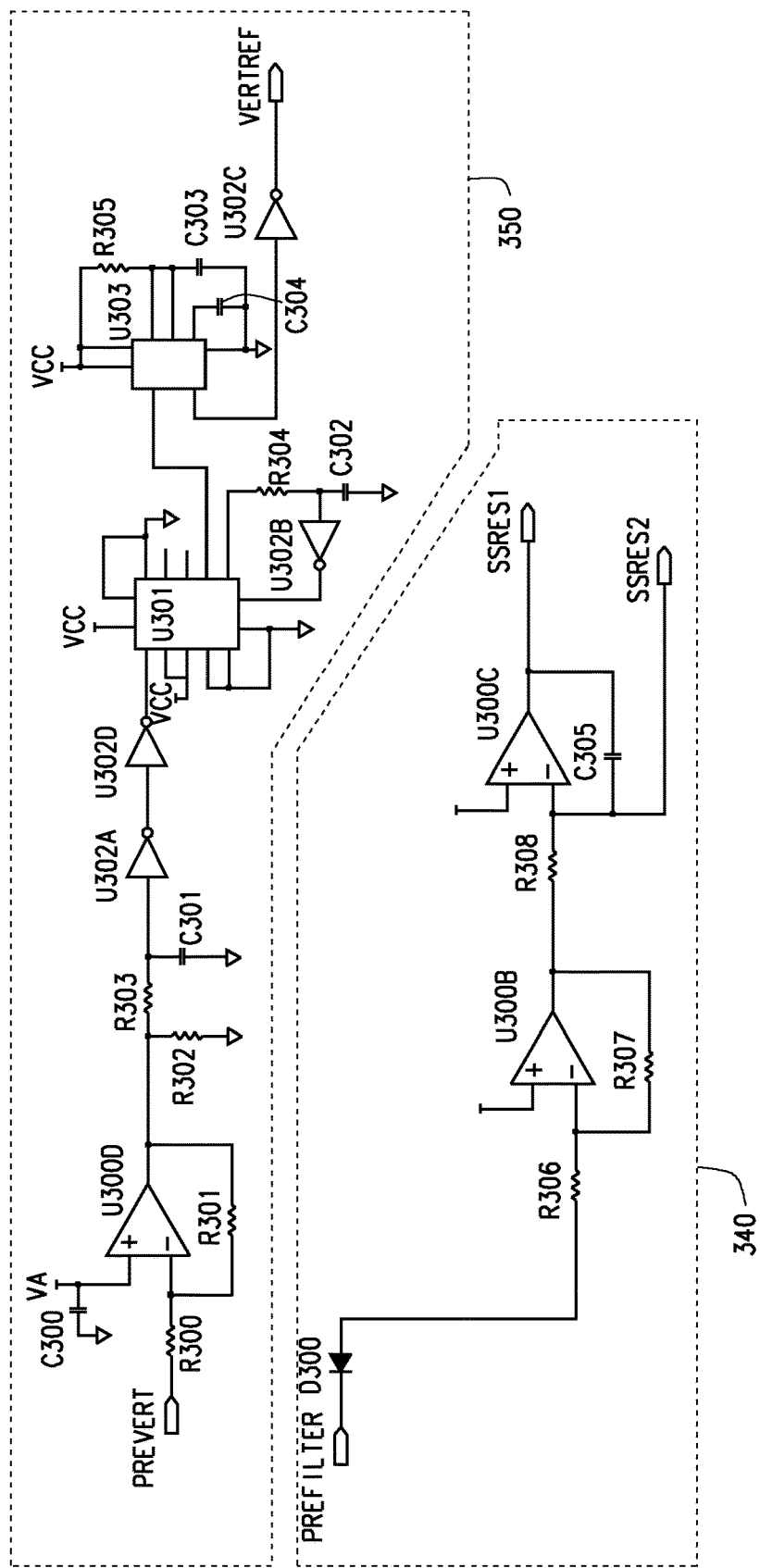
FIG. 8 is a schematic circuit diagram of analog vertical synch and signal strength detection of the data decoder of the invention.

Referring now to FIG. 8, the circuitry of vertical detect/signal strength circuitry 106 in the preferred embodiment comprises a signal strength detector 340 and an analog vertical sync 350. Signal strength detector 340 first comprises a rectifier D300 that polarizes video signal 18. Thereafter, video signal 18 transitions through a buffer comprised of resistor R306 and R307, voltage VA, and operational amplifier U300B to invert the signal. The last portion of this circuit is an integrator, which measures the strength of video signal 18 and is comprised of resistor R308, capacitor R305, voltage VA and operational amplifier U300C, all of which are operatively associated as shown. The output of the integrator is signal SSRES1 and is received by microcontroller 100 which then resets the signal strength integrator.

The signal for analog vertical sync 350 is passed from low pass filter—80 KHz cutoff 320. Analog vertical sync 350 generates the desired vertical synchronization signal used to synchronize the reading of data bits from auxiliary data 21. The first part of circuitry is a gaining amplifier that gains the signal and inverts it by use of resistor R300 and R301, capacitor C300, voltage VA and gate U300D. The second part of the circuitry provides a small filtering stage. Resistors R302 and R303 and capacitor C301 filter high spikes out of the signal.

Thereafter, the signal is processed by schmitt trigger inverters U302A and U302D, the double inversion acting as a buffer. Because of the nature of the schmitt trigger, voltage spikes are removed from the signal. Thereafter, the signal triggers a flip flop 74HC74. The output of the flip flop 74HC74 triggers a 555 timer 555, which is used to generate a constant timed pulse. During each pulse, regardless of how many triggers the 555 timer 555 receives, it will not generate interloping pulses until it times out. Resistor R305 may be used to adjust the time constant, by which the pulse can become wider or narrower. If microcontroller 100 detects the pulse and then waits for another vertical retrace period (i.e., 16.67 milliseconds) and detects the pulse again, it knows that it has locked on the vertical synchronization signal.

Figure 9:
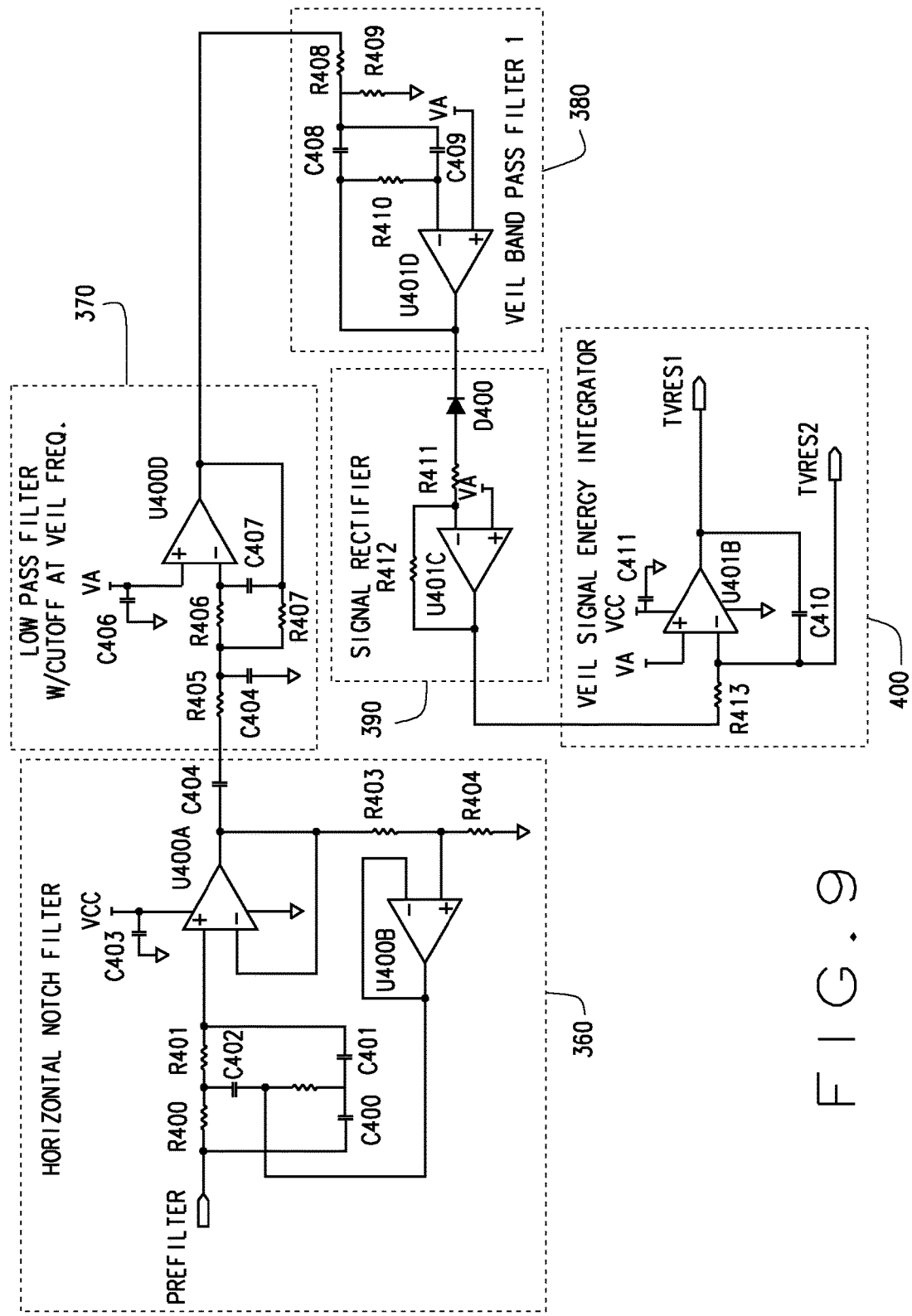
FIG. 9 is a schematic circuit diagram of data signal detection circuitry of the data decoder of the invention.

Referring to FIG. 9, the pre-filter signal is passed to a horizontal notch filter 360 that removes video signal 18 at the horizontal line scanning rate (i.e., 15570 KHz) from modulated video signal 22 so that it does not interfere with the reading of auxiliary data 21. Thereafter, low pass filter with cutoff at VEIL Freq. 370 is used for extra filtering to ensure that the signal higher than the 8 kilohertz is discarded. Then, the signal is passed to a band pass filter 380 which is another stage of filtering around 8 kilohertz. The signal then goes through a signal rectifier 390 that acts as an integrator that has a gain of one. Finally, the signal travels through a VEIL signal energy integrator 400 that measures the strength of the signal by measuring its voltage. The aforementioned circuits consists of a number of resistors R400-R413, capacitors C400-410, voltages VA and VCC, and operational amplifiers U400A, U400B, U400D, U401D, U401C, and U401B, all of which are operatively associated as shown.

Figure 10:
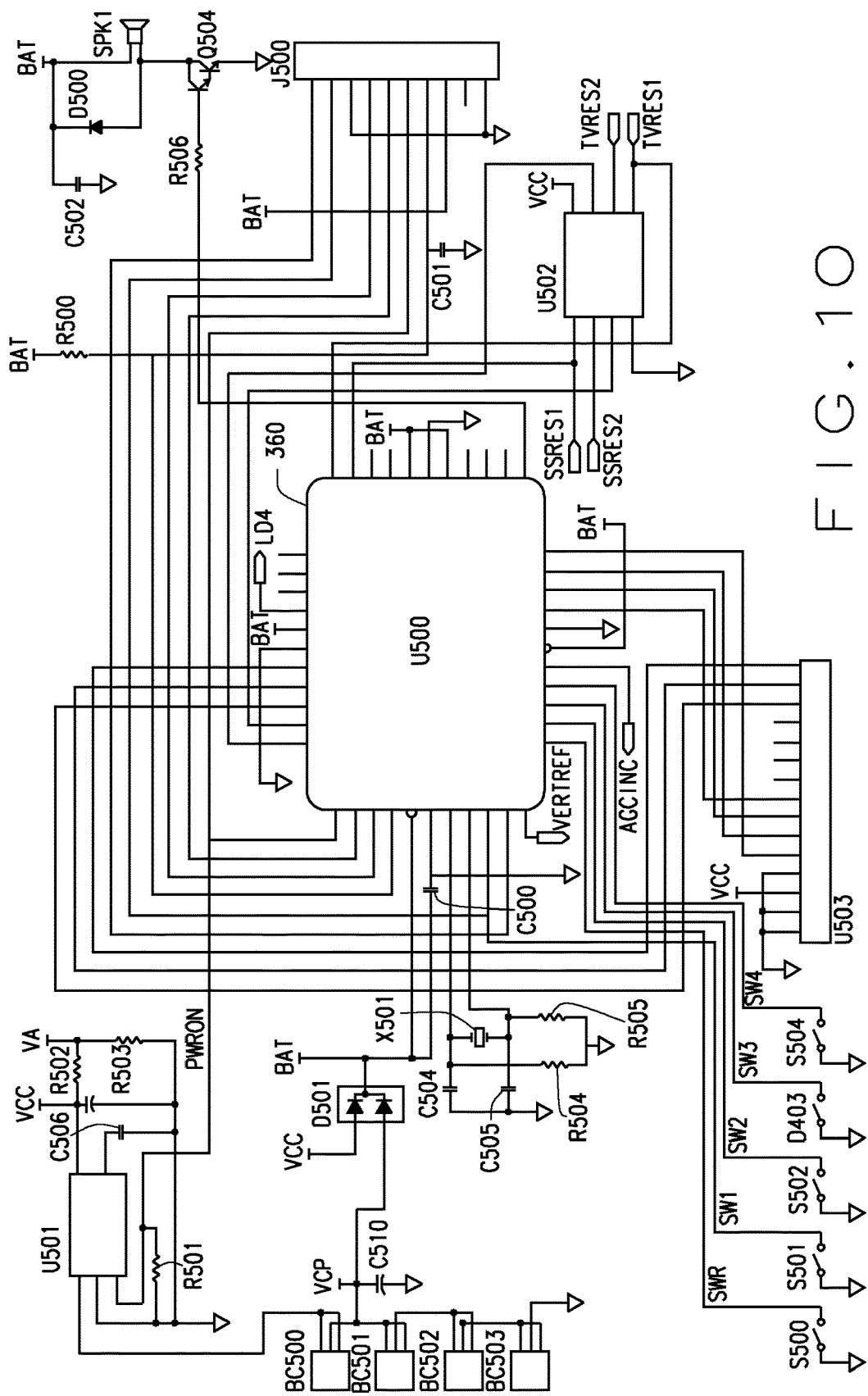
FIG. 10 is a schematic circuit diagram of a microcontroller of a first embodiment of the data decoder of the invention.

As shown in FIG. 10, microcontroller 100 and associated circuitry as would be used in a first version of the combination of slotted-hand device 29, data decoder 72 and interface card 60 in a non-slotted hand-held device 28 with photodetector 62 first comprises a power source consisting of four batteries BC500, BC501, BC502 and BC503. Each battery is 1.5 volts, and the power is provided to voltage regulator U501. Voltage regulator U501 provides microcontroller 100 with a steady 5 volts of power through D501. VCC and VA are also provided by voltage regulator U501, wherein by means of a voltage divider VA is 2½ volts and VCC is 5 volts. VCC is being fed through a diode D501 that provides battery voltage.

Diode D501 allows microcontroller 100 to go into a sleep mode so as to reduce its need for voltage. When microcontroller 100 wants to sleep, it can shut of voltage regulator U501 and go into sleep mode. Dual analog switch MAX323 is used to reset both the signal strength integrator and the VEIL signal strength integrator via the microcontroller 100.

Further components present in this embodiment are speaker SPK1, transistor Q504, visual display U503, switches S500, S501, S502, S503 and S504, and interface RS232, all of which are operatively associated as shown and the use of which are in accordance with the present invention as well as the hand-held devices described in Koplar I, Koplar II and Withers.

Figure 11:
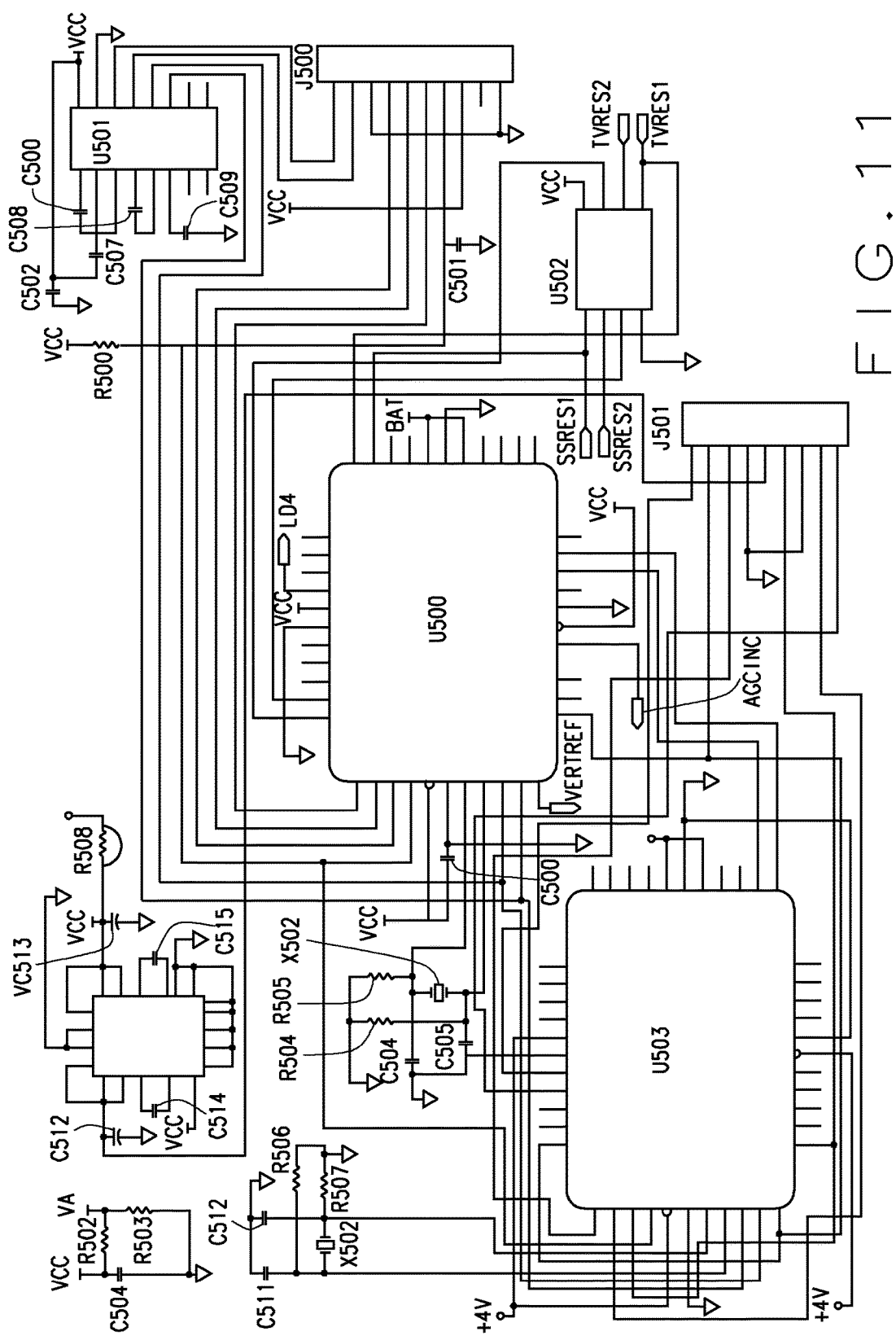
FIG. 11 is a schematic circuit diagram of a microcontroller of a second embodiment of the data decoder of the invention.

In an alternate but preferred version of the present invention, microcontroller 100 in FIG. 11 is shown as implemented on interface card 60. Microcontroller 100 is shown in this preferred embodiment to be comprised of two separate microcontrollers U500 and U503, of which microcontroller U500 controls the operations of microcontroller 100 as described in FIG. 10 above such as optical detection and determining whether auxiliary data 21 is present in video signal 18, and microcontroller U503 manages the interface with slot 66 (i.e., SDIO connector J501). SDIO connector J501 communicates with interface card 60 as described below. Microcontroller U503 further controls the communication between the optical and SD portions of the circuitry. Preferably, microcontroller U503 runs at 8 MHz while microcontroller U500 runs at 4 MHz.

Port RS232 is a computer interface which may optionally be included in various embodiments such as to debug the system to ensure that the proper auxiliary data is being received and modulated on interface card 60. Integrated circuit Max232 allows interface card 60 to communicate via a computer port RS232 so that interface card 60 may directly interact with a computer such as for debugging purposes.

Games may include participatory type games, which can include: (1) Games revolving around trivia questions dealing with subjects such as sports, music, news, movies; (2) Games revolving around Multiple choice questions; (3) Games dealing with true or false/yes or no type questions; (4) Games dealing with guessing letters; and (5) Games dealing with question revolving around Who? What? Where? When? How? or Why? Signals are received, detected, and reproduced by the new hand-held devices for various promotional opportunities including: enjoyment; promotion; coupon or prize validation; advertising by sponsors; advertising verification and polling; transfer of information; data collection; commercial verification; security and access; education; game playing; transactions, verifications, or redemption by sponsoring entities or related commercial locations at points of sale including the Internet; other commercial and non-commercial purposes.

In the preferred embodiment, a power source is not needed on interface card 60 as power is provided through slot 66. However, a charge pump U504 changes the three volts received from slot 66 into five volts so as to properly power interface card 60. Other components as used in FIG. 10 as shown in FIG. 11.

Figure 12:
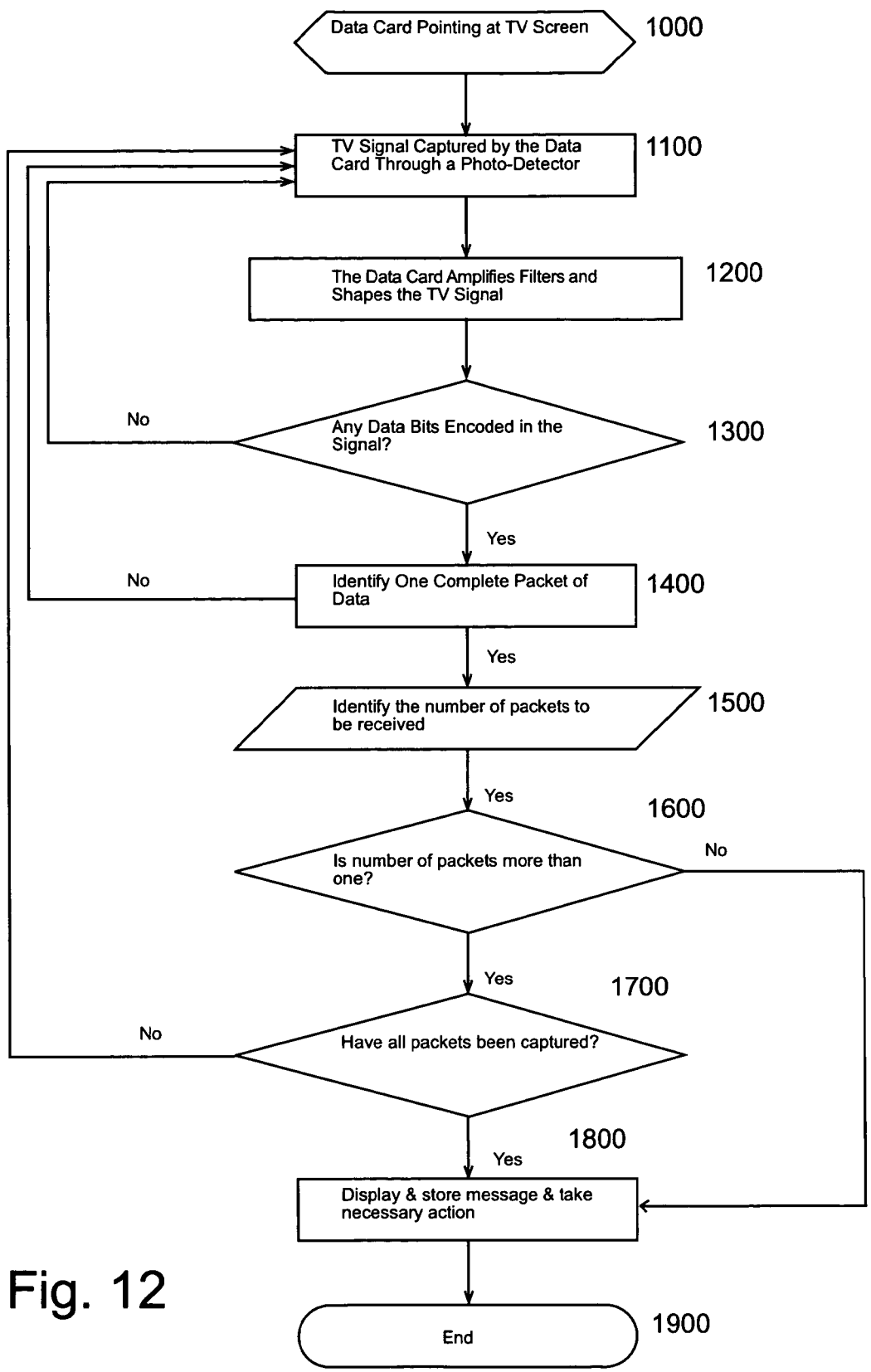
FIG. 12 is a flow chart of the method of decoding of the present invention.

The preferred embodiment of a method of modulating a video signal 18 with auxiliary data 21 in FIG. 12. In a first step 1000, a user orients or connects a receiver, such as slotted hand-held device 29, towards or in connection with a display device 26 for the purpose of capturing modulated video signals 28. Thereafter, in a second step 1100, a video signal 18 is captured from display device 26 by a photodetector 30 of interface card 60. A microcontroller 100 and device circuitry 104 amplify, filter and shape video signal 18 received during a third step 1200.

Still referring to FIG. 12, during a fourth step 1300 microcontroller 100 determines whether auxiliary data 21 is present in video signal 18 (i.e., whether video signal 18 is modulated video signal 22). If there is no auxiliary data 21 present in video signal 18, the method returns to second step 1100 and again attempts to capture modulated video signal 22. If in fourth step 1300 microcontroller 100 determines that auxiliary data 21 is present, then the method proceeds to a fifth step 1400 wherein microcontroller 100 determines whether a complete data packet 112 has been received by interface card 60. If auxiliary data 21 is not in the form of data packet 112 or is otherwise unusable, auxiliary data 21 is discarded and the method returns to second step 1100.

If auxiliary data 21 is in the form of data packet 112, during a sixth step 1600 microcontroller 100 determines the total number of packets 114 that interface card 60 expects to receive and the identification of a data packet number 116 of the just received data packet 112. If the total number of packets 114 to be received by interface card 60 is 1, then microcontroller 100 takes further action necessary to provide the user of slotted hand-held device 29 with a benefit as a result of receiving all of the desired auxiliary data 21 (e.g., promotional opportunities) as disclosed in a ninth step 1800. If total number of packets 114 is greater than 1, then microcontroller 100 proceeds to an eighth step 1700 whereby microcontroller 100 determines whether every data packet 112 corresponding to each data packet number 116 has been captured.

If in the eighth step 1700 all data packets 112 have not been captured, interface card 60 returns to the second step 1100 so as to attempt to capture the missing data packets 112. If all data packets 112 have been captured, slotted hand-held device 29 proceeds to provide the promotional opportunities to the user according to ninth step 1800. During the ninth step 1800, a user of slotted hand-held device 29 receives promotional opportunities or other benefits that may include textual information, prizes, coupons, games, special access privileges, etc. Thereafter, the method of the present invention is terminated during a final step 1900.

Figure 13:
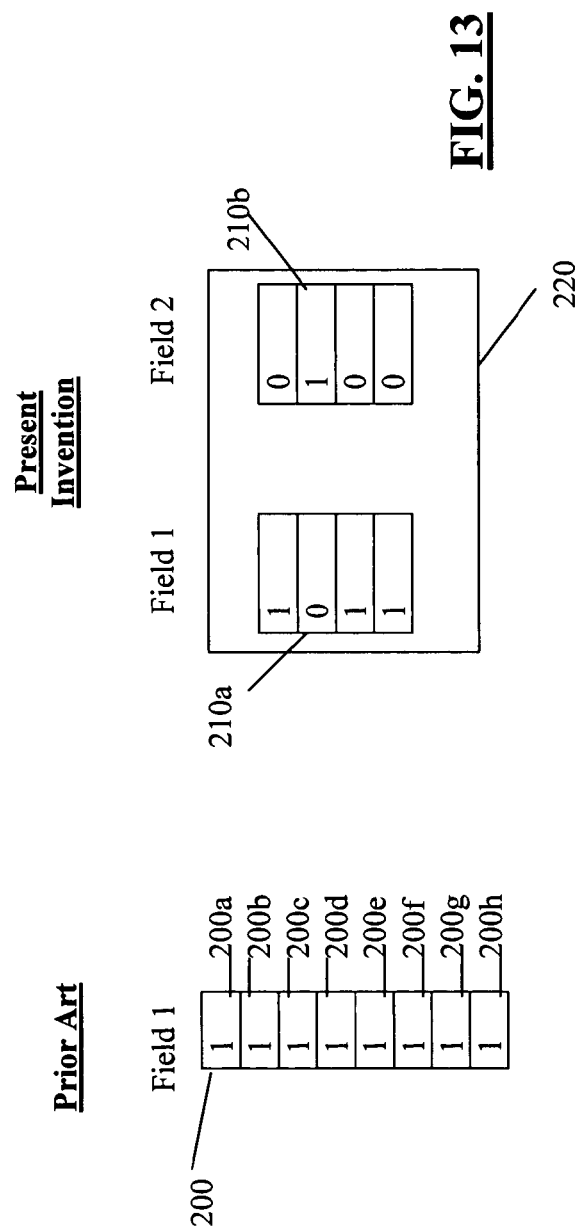
FIG. 13 is a graphic representation of the fields of the present invention.

During the foregoing method, the fields of video signal 20 are encoded differently than in Broughton. Broughton's method involves encoding each portion of a field 200 with an identical bit. As shown in FIG. 13, every slice 200*a-h* of field 200 contains the bit "1".

With the present invention, fields 210*a* and 210*b* of a frame 220 are encoded with complementary bits. Thus, a logic "1" is encoded in two fields 210*a* and 210*b* as "1 0", and a logic "0" is encoded in two fields 210*a* and 210*b* as "0 1". When interface card 60 receives the bits, it performs a field comparison by subtracting the result of the intensity of two successive fields 210*a* and 210*b*. This method produces a reliable data rate of 30 bits per second.

As shown in FIG. 13, the speed of the present invention is increased by splitting every field 210 into multiple segments with each portion having its own respective bit. Preferably, each field 210 is split into four equal portions such that each portions is at an equal offset from one another. Thus, fields 210*a* and 210*b* splits appear in FIG. 13 with the 4 data bits decoded as "1 0 1 1". This method of splitting the fields produces a reliable rate of 120 bits per second data.

For the foregoing method to function, during the second step of FIG. 12, microcontroller 100 needs to determine where fields 210*a* and 210*b* begin during decoding so that it can properly obtain all of the bits. In a first embodiment, data decoder 32 obtains its proper timing by looking for and synchronizing to the vertical retrace period in video signal 20.

Figure 14:
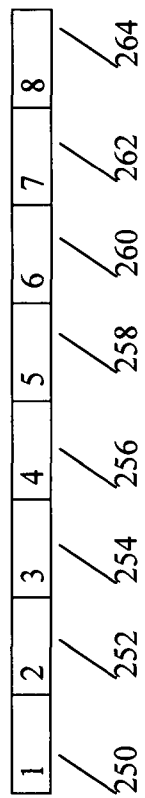
FIG. 14 is a graphic representation of a data packet used in the present invention.

Referring to FIG. 14, microcontroller 100 first looks for a section of the picture presented on display device 26 that is completely black (i.e., no video) and therefore may be a vertical retrace signal indicating that a vertical refresh of the picture has occurred. Thereafter, microcontroller 100 waits a sufficient time for another vertical refresh to occur (i.e., 16.67 milliseconds). If microcontroller 100 reads two successive regions that are completely black, and they are 16.67 milliseconds apart, microcontroller 100 acts under the belief that it has locked on the vertical retrace signal and continues to read and record data packets 112 at a preferred displacement of 2 milliseconds from the beginning of the vertical retrace signal. If during the foregoing synchronization process data decoder 32 fails to detect a first and a second black region, it will continue attempting to synchronize by searching for black regions that are 16.67 milliseconds apart beyond where it previously looked.

Once the vertical retrace signal is synchronized, and data decoder 32 successfully reads valid data, data decoder 32 is then in synchronization with video signal 18 and temporarily stops looking for the vertical retrace signal. Under the first preferred embodiment of video signal 18 locking of the present invention, data decoder 32 locks on the vertical retrace signal for a few seconds and thereafter releases it and the synchronization process starts over again. Re-detection and re-synchronization of the present invention in this embodiment is preferred because timing of microcontroller 100 is not entirely accurate, therefore causing the synchronization of the vertical retrace signal to drift after a few seconds and making it more difficult to detect valid auxiliary data 21.

In a second but preferred embodiment, the beginning of auxiliary data 21 is determined by looking for a sync. Data decoder 32 looks for a first data bit in data packet 112, such as A5, that acts as a marker or preamble. Data decoder 32 drifts very slowly across display device 26 trying to capture the marker, then data decoder 32 acts as though it is at the start of data packet 112 and sequentially reads the various bits. The data bits are read sequentially and then shifted in a register to its left, so that data decoder 32 receives the A5 byte first. Once a valid data packet 112 is received, then data decoder 32 is perfectly synced and can continue to read successive data packets 112. Data decoder 32 is ensured of a valid data packet 112 by checking the CRC byte of data packet 112.

Auxiliary data 21 is read by microcontroller 32 in data packets 112 of preferably 8 bytes (i.e., 64 bits) in length. As shown in FIG. 14, the preferred embodiment of data packet 112 first comprises a first byte 250 containing a preamble that identifies it as the start of data packet 112. A second byte 252 contains the data packet number 26 relative to the total number of packets sent 25 (i.e., packet is 2 of 5). The following five bytes 254, 256, 258, 260 and 262 (i.e., bytes 3-7) contain actual data, which may be compressed as will be readily understood by someone skilled in the art of data compression. The final byte 264 contains a Cyclic Redundancy Check (CRC) to ensure that the received data bytes 250-262 were precisely matched with those transmitted from the signal source.

Data packets 112 of a message 118 are typically sent by broadcast source 14 more than one time as will be appreciated in the art of computer networking. Message 118 in the preferred embodiment may contain up to 16 data packets 112. Data packets 112 may be received by slotted hand-held device 29 or other receiver in any order, and any data packets 112 that have previously been successfully captured by slotted hand-held device 29 will be ignored. Once all data packets 112 have been correctly received by slotted hand-held device 29, the entire message 118 is then declared to have been successfully decoded, and slotted hand-held device 29 takes appropriate action by providing the user with a benefit or one or more other promotional opportunities.

Figure 15:
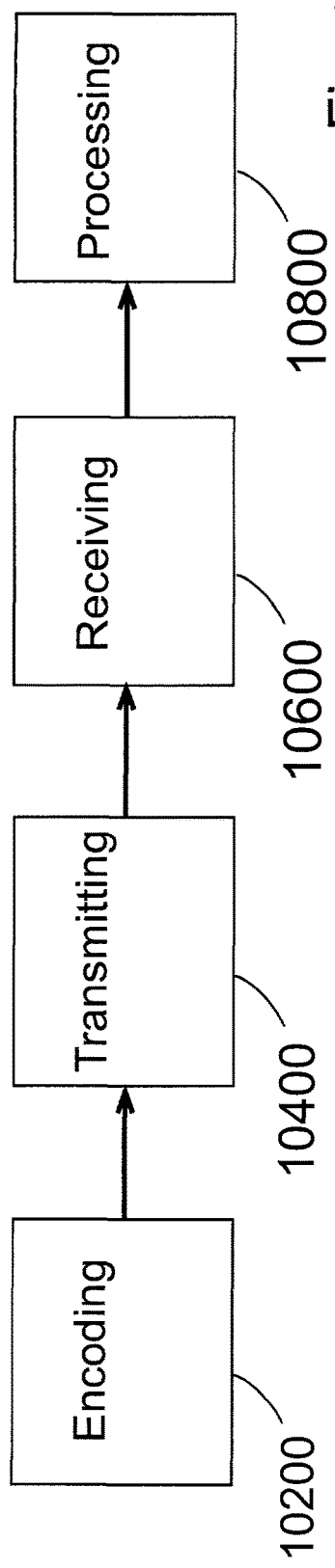
FIG. 15 is a block diagram of the method of radio frequency detection using RBDS by a hand-held device.

The present invention utilizes a novel method of transmitting auxiliary data to hand-held devices using the existing RBDS system. This method of the present invention is shown in FIG. 15 and described herein. A first encoding step 10200 comprises modulating a FM signal with data that will be transmitted within a subcarrier of the FM signal. Encoding step 10200 preferably transpires at a radio station, but alternatively transpires at a location that records radio commercials.

Figure 16:
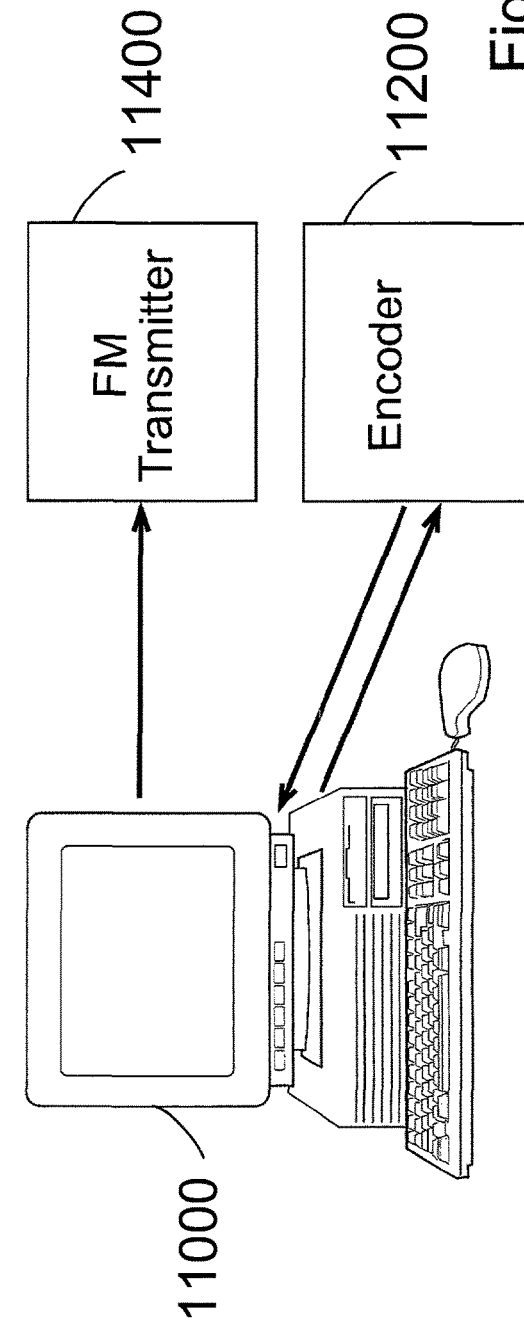
FIG. 16 is a block diagram of the method of encoding information on radio signals using a computer with RBDS encoder.

Turning to FIG. 16, encoding step 10200 may be observed in more detail. In encoding step 10200, a sponsor enters a promotional opportunity (in the form of data) that it wishes to provide users into a computer 11000. Computer 11000 processes its input and, using RBDS encoder 11200, encodes the information within a subcarrier of the FM signal. More specifically, the RBDS methodology used with the present invention impresses the information onto a 57 kHz subcarrier within a designated frequency (e.g., 94.7 mHz). Once the FM signal is modulated to contain a subcarrier with the promotional opportunity, the FM signal is ready to be transmitted by use of FM transmitter 11400.

The preferred method of transmitting information via FM transmitter 11400 using RBDS is through the use of an existing FM radio station (that broadcasts on a known frequency) during a prerecorded commercial. (FM transmitter 11400 and FM radio station are referred to collectively hereinafter as the "RBDS signal source".) In this way, encoding step 10200 as shown in FIG. 15 may be completed in advance of a commercial's airing, such that additional radio station personnel will be unnecessary at the time of commercial transmission. Alternatively, encoding step 10200 may occur such that the FM signal is modulated in real-time immediately before it is transmitted via transmitting step 10400. By either method, the encoded information is preferably synchronized to whatever audio is contained with the main carrier of the FM signal. It will be appreciated in the art that the methods of triggering the inclusion of the information may be used interchangeably depending on the manner in which a sponsor desires to provide the promotional opportunity.

Referring back to FIG. 15, transmitting step 10400 effectuates the transmission of the modulated FM signal after the completion of encoding step 10200. The FM signal may be transmitted as is common with non-modulated FM radio wave signals as will be appreciated in the art. The FM signal is transmitted via airwaves and may be received by hand-held devices, as well as standard radios that are incapable of providing promotional opportunities described herein.

Appropriately tuned hand-held devices during receiving step 10600 may receive the FM signal as will further be described below. Once the FM signal is received by hand-held device, a processing step 10800 occurs in which the FM signal is processed and, when information containing a promotional opportunity is present within the FM signal, a user is presented with a promotional opportunity on device.

When desirable, users of hand-held device may receive notification of the transmission of a promotional opportunity. In the preferred embodiment, users are alerted via the audio contained with the main carrier of the FM signal. Users listening to a radio may be instructed to "hold down your button now to receive an opportunity", or otherwise may be advised that they will soon receive or just have received a promotional opportunity on their hand-held device. However, under the present invention it is not necessary for a user to listen to a radio to receive promotional opportunities. Hand-held device, however, must be "listening" to a frequency to detect the subcarrier. Therefore, as an alternative, an alert may come directly from hand-held device. The users may be alerted either audibly or visually, such as may include a "beeping" or other sound, the lighting of a LED, shaking or other vibration of hand-held device, or a text message displayed on LCD 4400.

The promotional opportunity may be processed by hand-held device via various methods including those described in Koplar I and Koplar II, depending on the money allocated to the manufacturing cost of device and the application in which device is to be used. In the preferred embodiment, the information received by hand-held device contains all the text to be displayed to provide the user with the promotional opportunity.

Alternatively, the information sent to hand-held device may be a trigger for pre-stored promotional opportunities. Once a trigger has been received and processed by hand-held device, the user may receive an audio or visual indication that an opportunity is forthcoming or that an opportunity has just been received by device.

The information received by hand-held device may contain means to differentiate and categorize the promotional opportunities through use of a classification code. The classification code corresponds to a category of a promotional opportunities, such categories may be found to include apparel, automotive, computers, contests, dining, electronics, entertainment, financial services, groceries, health and beauty, home and garden, Internet websites, children, pet products and travel. The aforementioned list is an example only, and other types of categorization schemes may be used depending on the applications in which hand-held device are to be used.

A stored record contains a database with flags of the user's preferences. Users identify the categories in which they wish to receive promotional opportunities. The categories may be set upon issuance of hand-held device, but is preferably programmed directly by the user either by connecting device to a computer (via the methods of computer connection are described in Koplar I and Koplar II) to download a configuration to device. When a classification code is received by hand-held device, device makes a comparison of the classification code received against the stored record to determine whether device should store the promotional opportunity and alert the user, ignore the promotional opportunity, or take another action as may be designated by the sponsor (or the user). The stored record may alternatively indicate that some promotional opportunities should be immediately stored and displayed to the user, while other categories of promotional opportunities should provide the user with the ability to view, store, and/or immediately discard the received promotional opportunities. It will be appreciated in the art that this concept of promotional opportunity categorization is novel to hand-held devices and may be modified and expanded to encompass known techniques for "opt-in" mailing. Thereby, users of hand-held device will not have to parse numerous promotional opportunities that they are not interested in to locate the opportunities that are of value to them. It will be also appreciated that the method of promotional opportunity categorization may function outside of hand-held device and may work with other types of devices.

Figure 17:
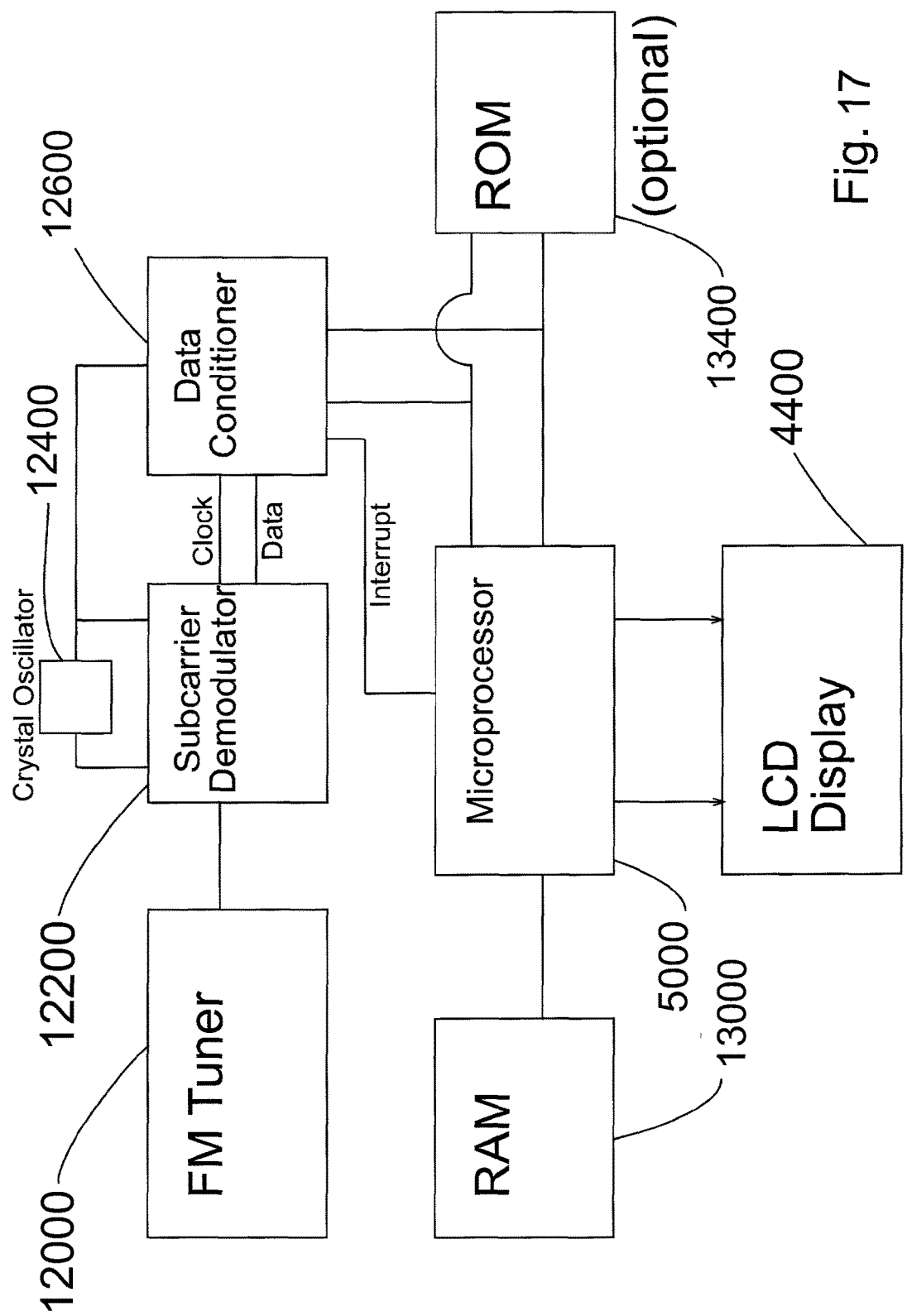
FIG. 17 is a another block diagram of the method of radio frequency detection using RBDS by a hand-held device.

Turning now to FIG. 17, the circuitry of the hand-held device may be observed. FM tuner 12000 is used in receiving step 10600 to receive the FM signal on hand-held device. FM tuner 12000 also initiates processing step 10800 and preferably contains means to detect both the main carrier (which contains the audio) and the subcarrier (which contains the information). Without the detection means of the main carrier, it is impractical to make FM tuner 12000 sensitive enough to identify the subcarrier.

FM tuner 12000 receives the FM signal (e.g., double side band suppress carrier) containing the auxiliary data at the radio frequency specified on crystal oscillator 12400. Subcarrier demodulator 12200 then processes the FM signal by converting the subcarrier signal, if present, into a data stream. Thereby, the information that was originally encoded in the studio is extracted into a raw form (i.e., the data stream). The data stream, as it exists after being created by the subcarrier demodulator 12200, is in such a raw form that it is virtually unusable. The data stream consists of a clock signal and data signal. The clock signal is synchronized to the clock of computer 11000.

The ways in which FM tuner 12000 tunes to a specific frequency depends on the application. The preferred embodiment is permanently set upon crystal oscillator 12400, so that hand-held device leaves the factory and remains at a constant frequency. Alternatively, FM tuner 12000 may control crystal oscillator 12400 such that it constantly scans radio frequencies until it locates a modulated FM signal. It then stops scanning, and determines whether the modulated FM signal is relative to the desired application. The third method is where FM tuner 12000 is directly controlled by the main microprocessor 12800. Microprocessor 12800, with or without input from the user, may decide to scan every frequency or it may have a list of frequencies at which to look. It will be appreciated that hand-held device may be configured to receive only those FM signals of a particular station, of a particular parent company, or within a particular market (e.g., St. Louis, Mo.).

The clock signal and data signal may be observed to travel from subcarrier demodulator 12200 to data conditioner 12600. Data conditioner 12600 is configured to be compatible with computer 11000 so that data conditioner 12600 is capable of parsing out the transmitted information.

It will appreciated in the art that as the signal travels from FM tuner 12000 to subcarrier demodulator 12200, the FM signal may be received by an amplifier (not shown) so that a user may hear the audio (i.e., voices and music) contained with the FM signal.

In the preferred method of the present invention, there is no start and stop pulse transmitted along with the information. This configuration differs from computer processing on a home computer, wherein the signals contain a start pulse, 8 bits of data, and a stop pulse. On a home computer, at the receiving end of the data the computer looks for a stop pulse. However, with the preferred method of the present invention, it is undesirable to allocate time and resources to look for the start and stop pulses. Data is sent continuously without start and stop pulses and instead an error correction code is sent and used. After two bytes of data are sent, the correction code is sent. During encoding step 10200, encoder 11200 processed the FM signal and the algorithm was performed prior to its transmission. The computer uses its knowledge of the information to obtain the correction code. The correction code, when received by hand-held device is processed by the reverse of the algorithm to determine the originally sent information. Data conditioner 12600 therefore extracts the information from the data stream. Every time data conditioner 12600 extracts a block of data, it comes up with a status and two data bytes. The status byte tells it which portion of the transmission it is receiving. The transmission consists of four bytes, the first of which is a status byte tells the data conditioner which block its is receiving, and the next two bytes are the actual data, and the fourth contains no data.

As soon as data conditioner 12600 receives the first three blocks, it generates an interrupt pulse. The interrupt pulse alerts microprocessor so that data conditioner has data and that microprocessor 5000 should retrieve it. As will be understood in the art, an "interrupt" means that whatever a computer is doing prior to its receipt of the interrupt, it stops and handles the interrupt's request. When microprocessor 5000 completes the task designated to it by the interrupt, it returns to its originally processing. Under the present invention, microprocessor 5000 sees the interrupt and queries data conditioner 12600 as to what data it has. The information transferred from data conditioner 12800 to microprocessor 5000 is preferably through the i-squared-c protocol, a Phillips proprietary protocol that is well known in the art.

When microprocessor 5000 sees that the information is a promotional opportunity, it puts the opportunity into RAM 13000. There are four blocks of data sent every time. The first block is the PI code, which contains the station identifier or network ID. The second block describes what type of information is being sent in the group of four blocks. In the preferred embodiment, it will be group 2 radio text. It may alternatively be navigation information, raw data, or other type of data that could be usable within the system of the present invention.

The second block tells the specific location within the message of the next four bytes that will be received. Microprocessor 5000 stores the location information within its own internal RAM (not shown) so that it has quick access to the information. After receiving the last two blocks, microprocessor 5000 knows where in RAM that it needs to put the blocks. Microprocessor 5000 stores the data in RAM for its future use.

One of the bits sent within the second block is an AB flag. Microprocessor 5000 is working on two promotional opportunities simultaneously. The first promotional opportunity is the one presently being displayed; the second promotional opportunity is the one being received. When the second promotional opportunity is complete, and the sponsor decides to send a new promotional opportunity, the AB flag changes status. The flag's change alerts microprocessor 5000 that the first promotional opportunity has been sent. Microprocessor 5000 then pulls the promotional opportunity out of RAM and displays it on LCD display 44. While hand-held device displays this promotional opportunity, the first promotional opportunity will continue to be received. The promotional opportunity will continue to be displayed received until the AB flag changes. Then hand-held device displays the promotional opportunity from RAM, and begins to receive another new one. As it displays the promotional opportunity, it clears RAM to remove artifacts of left over characters. The main processor constantly looks for the flag. This process is effective when the promotional opportunities are received and not kept, such as baseball statistics during a radio baseball game broadcast. It will be appreciated that it may be desirable to retain and reuse opportunities, and the method described herein may be altered to provide such capability.

Electronically coupled to subcarrier modulator 12200 and data conditioner 12600 is crystal oscillator 12400. Crystal oscillator 12400 is compatible with a crystal oscillator located with encoding computer 11000. Crystal oscillator 12400 is a precise timing mechanism that synchronizes the data coming into hand-held device.

ROM 13400, although optional, is used in the preferred method of the present invention. ROM 13400 provides an efficient means for providing a way of distinguishing between various hand-held devices, so that may be identifiable and, when desired, unique. By storing an ID in ROM 13400, hand-held device is capable of providing many of the promotional opportunities described in Koplar and herein.

Under the present invention, microprocessor 5000 inserts a space in place of each character that it moved to LCD display 44. In applications of device where it is desirable to retain promotional opportunities, the promotional opportunities are placed into a different place in RAM 13000 while the user is reading them. Promotional opportunities are stacked until RAM 13000 is filled to its capacity.

Microprocessor 5000 can distinguish between the various promotional opportunities, by using time signal transmitted every minute. Microprocessor 5000 may need to be equipped with a built in clock that synchs to the radio station once a minute. As the promotional opportunity is being displayed on LCD display 44 and is being saved into a higher place in RAM 13000, the promotional opportunity may be time stamped. Thereby, each message has its own unique identifier, which may be used a means of archiving the promotional opportunities.

The preferable means of providing users controls under the present invention is by means of a keypad (not shown) that connects to microprocessor 5000. The preferable method of configuring hand-held device with a keypad is by inserting a check keypad command into the main loop of microprocessor 5000, such that if the keypad is pressed microprocessor will initiate a subroutine function to handle the user request. It will be appreciated that the keypad has functionality similar to the functionality described in Koplar and herein. ROM 13400 provides a means by which each hand-held device may have a unique number. As information is sent, the code can be embedded within text. Use of a symbol at the beginning of a series of numbers when received by hand-held device may cause the numbers not to be displayed but instead compared to the number contained with ROM 13400. When a user's unit matches the number received to the number contained within ROM 13400, hand-held device can react in a special or unique way, to provide promotional opportunities as described in Koplar and herein.

The handheld device 12 may receive data such that sports fans may get live statistics and trivia through use of their hand-held device 12 while they watch the game live and at home. The data at the hand-held device 12 may also download or receive a question, either during the broadcast or prior to the broadcast, by use of auxiliary data and the methods described herein. The questions are synched to a broadcast, such that when hand-held device 12 first presents the questions, the auxiliary data triggers hand-held device 12 to display the question and possible answers. The user chooses the correct answer, or places the answer in order in a timely manner, or must otherwise comply with the rules of trivia game request in a similar manner to that of the contestants. Hand-held device 12 may also be used with other trivia applications as follows: User takes hand-held device 12 and appropriately configures it to receive modulated video or signals from broadcast device. In an example, any participatory game shows produced for television distribution, whether produced and distributed for broadcast, cable, direct satellite, or close circuit transmission; whether distributed by means of home video or DVD may be encoded with auxiliary data enabling viewers of programming material to decode either optically or electronically; process, store and display the data on hand-held device 12 for the purpose of winning prizes or accumulating points. Participatory type games include: (1) Games revolving around trivia questions dealing with subjects such as sports, music, news, movies; (2) Games revolving around Multiple choice questions; (3) Games dealing with true or false/yes or no type questions; (4) Games dealing with guessing letters; and (5) Games dealing with question revolving around Who? What? Where? When? How? or Why? Signals are received, detected, and reproduced by the new hand-held devices for various promotional opportunities including: enjoyment; promotion; coupon or prize validation; advertising by sponsors; advertising verification and polling; transfer of information; data collection; commercial verification; security and access; education; game playing; transactions, verifications, or redemption by sponsoring entities or related commercial locations at points of sale including the Internet; other commercial and non-commercial purposes.

It should be understood from the foregoing that, while particular embodiments of the invention have been illustrated and described, various modifications can be made thereto without departing from the spirit and scope of the invention. Therefore, it is not intended that the invention be limited by the specification; instead, the scope of the present invention is intended to be limited only by the appended claims.

What is claimed is:

1. A method comprising:
  receiving on the mobile electronic device, at a frequency, a transmission of a first encoded audio signal, the first encoded audio signal having first encoded information on a subcarrier of the frequency, the first encoded information including match data and an AB flag with a first status, the AB flag representative of which of plural different promotional opportunities are to be displayed on the mobile electronic device;
  processing the first encoded audio signal on the mobile electronic device to extract the first encoded information from the first encoded audio signal;
  selecting pre-stored promotional data on the mobile electronic device using the match data of the first encoded information;
  receiving a transmission of a second encoded audio signal at the frequency, the second encoded audio signal having second encoded information on the subcarrier of the frequency, the second encoded information including the AB flag with a different, second status;
  processing the second encoded audio signal on the mobile electronic device to extract the second encoded information; and
  responsive to detecting a change in the status of the AB flag to the second status, displaying a promotional opportunity on the mobile electronic device, the promotional opportunity displayed using the pre-stored promotional data on the mobile electronic device.

2. The method of claim 1, wherein the pre-stored promotional data includes a pre-stored audio signal that is a different audio signal than the first encoded audio signal, and the method further includes reproducing the pre-stored audio signal responsive to detecting the change in the status of the AB flag to the second status.

3. The method of claim 1, wherein the first encoded information is data.

4. The method of claim 1, wherein the pre-stored promotional data includes a classification code that identifies a category of the promotional opportunity.

5. The method of claim 4, wherein the promotional opportunity is displayed on the mobile electronic device responsive to the classification code matching a user preference that is stored on the mobile electronic device.

6. The method of claim 1, further comprising:
automatically tuning the mobile electronic device to the frequency,
wherein receiving the transmission of the first and second encoded audio signals occurs responsive to automatically tuning to the frequency.

7. The method of claim 1, further comprising:
receiving a user initiation request on the mobile electronic device from a user of the mobile electronic device,
wherein receiving the transmission of the first encoded audio signal occurs responsive to receiving the user initiation request.

8. The method of claim 1, wherein the subcarrier of the frequency is 57 kHz.

9. The method of claim 1, wherein the mobile electronic device is a card.

10. The method of claim 1, wherein the subcarrier is a Radio Broadcast Data System (RBDS) subcarrier.

11. The method of claim 1, wherein the promotional opportunity includes a verification of extraction of the first encoded information.

12. The method of claim 11, wherein the verification is an audible verification.

13. The method of claim 1, wherein the first encoded information includes four blocks of data.

14. The method of claim 13, wherein a block of the four blocks identifies a data type as group two radio text.

15. The method of claim 1, further comprising:
timestamping the promotional opportunity based on receiving the transmission of the second encoded audio signal.

16. The method of claim 1, wherein displaying the promotional opportunity includes presenting live sporting event statistics or live sporting event related trivia on the mobile electronic device.

17. The method of claim 1, wherein displaying the promotional opportunity includes displaying a question on the mobile electronic device that is synched with another device.

18. The method of claim 17, wherein displaying the question includes displaying a binary input to receive an input in reply to the question from a game participant.

19. The method of claim 17, wherein displaying the question includes displaying the question at a select time of a game.

20. The method of claim 1, wherein processing the first encoded audio signal includes determining a polling question and displaying the promotional opportunity includes providing the polling question on the mobile electronic device to receive interaction by a user.

21. The method of claim 1, wherein the pre-stored promotional data includes at least one of an electronic coupon, a prize, a game, or game data that was stored on the mobile electronic device prior to receiving the first encoded audio signal.

22. A non-transitory computer-readable storage medium comprising instructions, which when executed by one or more processors, cause the one or more processors to:
receive on the mobile electronic device, at a frequency, a transmission of a first encoded audio signal, the first encoded audio signal having first encoded information on a subcarrier of the frequency, the first encoded information including match data and an AB flag with a first status, the AB flag representative of which of plural different promotional opportunities are to be displayed on the mobile electronic device;
process the first encoded audio signal on the mobile electronic device to extract the first encoded information from the first encoded audio signal;
select pre-stored promotional data on the mobile electronic device using the match data-of the first encoded information;
receive a transmission of a second encoded audio signal at the frequency, the second encoded audio signal having second encoded information on the subcarrier of the frequency, the second encoded information including the AB flag with a different, second status;
process the second encoded audio signal on the mobile electronic device to extract the second encoded information; and
responsive to detecting a change in the status of the AB flag to the second status, displaying a promotional opportunity on the mobile electronic device, the promotional opportunity based on the pre-stored promotional data on the mobile electronic device.

23. The non-transitory computer-readable storage medium of claim 22, wherein the pre-stored promotional data includes at least one of an electronic coupon, a prize, a game, or game data that was stored on the mobile electronic device prior to receiving the first encoded audio signal.

* * * * *